(12) United States Patent
Henry et al.

(10) Patent No.: US 11,107,029 B1
(45) Date of Patent: Aug. 31, 2021

(54) SYSTEMS AND METHODS IMPLEMENTING AUTOMATED SHIPMENT STATUS TRACKING

(71) Applicant: Auctane, LLC, Austin, TX (US)

(72) Inventors: Paul D. Henry, Austin, TX (US); Byron J. Wier, Austin, TX (US); John Roland Clem, Manhattan Beach, CA (US)

(73) Assignee: Auctane, LLC, Austin, TX (US)

( * ) Notice: Subject to any disclaimer, the term of this patent is extended or adjusted under 35 U.S.C. 154(b) by 1236 days.

(21) Appl. No.: 14/642,534

(22) Filed: Mar. 9, 2015

Related U.S. Application Data

(60) Provisional application No. 62/082,393, filed on Nov. 20, 2014.

(51) Int. Cl.
*G06Q 10/08* (2012.01)
*G06F 16/903* (2019.01)

(52) U.S. Cl.
CPC ....... *G06Q 10/0833* (2013.01); *G06Q 10/083* (2013.01); *G06F 16/903* (2019.01); *Y10S 707/99933* (2013.01)

(58) Field of Classification Search
CPC .. G06Q 10/08; G06Q 10/0833; G06Q 10/083; G06Q 10/0835; G06Q 10/0832; Y10S 707/99933

(Continued)

(56) References Cited

U.S. PATENT DOCUMENTS 4,807,139 A  2/1989 Liechti
4,812,994 A  3/1989 Taylor et al.
(Continued)

FOREIGN PATENT DOCUMENTS

EP    1785856 A2   5/2007

OTHER PUBLICATIONS

Grabara, J. et al. "The Role of Information Systems in Transport Logistics", International Journal of Education and Research, vol. 2, No. 2, Feb. 2014. (Year: 2014).*

(Continued)

*Primary Examiner* — Michael P Harrington
*Assistant Examiner* — Brian A Tallman
(74) *Attorney, Agent, or Firm* — Norton Rose Fulbright US LLP

(57) ABSTRACT

Systems and methods which facilitate automated querying of shipping services status information using a rules based engine are disclosed. A shipping status query engine of embodiments implements various rules for intelligently querying one or more shipping service provider systems for information regarding the status of shipped items. Using the intelligent determinations of a rules base shipping status query engine, embodiments enable large scale, automated status queries for a very large number of shipped items. Having such automated access to updated status information for the shipped items, additional functionality may also be supported, such as to provide alerts, reminders, notifications, etc., upon detecting certain events and/or failure to detect certain events. Moreover, embodiments may be adapted to utilize the updated status information to initiate actions with respect to particular shipments based upon detected events and/or failure to detect certain events.

44 Claims, 2 Drawing Sheets

(58) Field of Classification Search
USPC ........................................................ 705/333
See application file for complete search history.

(56) References Cited

U.S. PATENT DOCUMENTS

| | | | |
|---|---|---|---|
| 5,010,485 A | 4/1991 | Bigari | |
| 5,121,327 A | 6/1992 | Salazar | |
| 5,822,739 A | 10/1998 | Kara | |
| 6,381,590 B1 | 4/2002 | Debois | |
| 6,385,731 B2 | 5/2002 | Ananda | |
| 6,424,954 B1 | 7/2002 | Leon | |
| 6,526,393 B1 | 2/2003 | Fredman | |
| 6,889,214 B1 | 5/2005 | Pagel et al. | |
| 7,149,726 B1 | 12/2006 | Lingle et al. | |
| 7,177,825 B1 | 2/2007 | Borders et al. | |
| 7,233,929 B1 | 6/2007 | Lingle et al. | |
| 7,243,842 B1 | 7/2007 | Leon et al. | |
| 7,383,194 B2 | 6/2008 | Heiden et al. | |
| 7,409,353 B1 | 8/2008 | Uslontsev et al. | |
| 7,430,424 B2 | 9/2008 | Kraft et al. | |
| 7,444,290 B2 | 10/2008 | Woods et al. | |
| 7,458,612 B1 | 12/2008 | Bennett | |
| 7,660,721 B2 | 2/2010 | Williams et al. | |
| 7,756,796 B2 | 7/2010 | Bodie et al. | |
| 7,765,168 B1 | 7/2010 | Dong et al. | |
| 7,827,118 B1 | 11/2010 | Smith, III et al. | |
| 7,882,042 B2 | 2/2011 | Meyer et al. | |
| 7,996,328 B1* | 8/2011 | Lundberg | G06Q 10/08 705/333 |
| 8,005,762 B2 | 8/2011 | Ogg et al. | |
| 8,255,337 B1 | 8/2012 | Bennett et al. | |
| 8,600,913 B2 | 12/2013 | Williams et al. | |
| 8,868,472 B1 | 10/2014 | Lin et al. | |
| 9,082,234 B1 | 7/2015 | Clem | |
| 9,230,233 B1 | 1/2016 | Sundaresan et al. | |
| 9,761,061 B1 | 9/2017 | Bussell et al. | |
| 9,824,380 B1 | 11/2017 | Chowdhary et al. | |
| 9,842,308 B1 | 12/2017 | Biswas et al. | |
| 9,922,302 B2 | 3/2018 | Gventer et al. | |
| 2002/0046051 A1* | 4/2002 | Katzman | H04L 69/329 705/26.1 |
| 2002/0161707 A1* | 10/2002 | Cole | G06Q 20/02 705/42 |
| 2003/0009425 A1 | 1/2003 | Stonedahl et al. | |
| 2003/0050819 A1 | 3/2003 | Koenigbauer et al. | |
| 2003/0088473 A1* | 5/2003 | Fisher | G06Q 10/063114 705/26.81 |
| 2003/0089765 A1 | 5/2003 | Kovlakas | |
| 2003/0101147 A1 | 5/2003 | Montgomery et al. | |
| 2004/0044586 A1 | 3/2004 | Gullo et al. | |
| 2004/0083179 A1 | 4/2004 | Sesek et al. | |
| 2004/0212833 A1 | 10/2004 | Taskett et al. | |
| 2005/0060165 A1 | 3/2005 | Knight et al. | |
| 2006/0173799 A1 | 8/2006 | Minnocci | |
| 2006/0213979 A1 | 9/2006 | Geller et al. | |
| 2006/0213980 A1 | 9/2006 | Geller et al. | |
| 2006/0224462 A1* | 10/2006 | Brezenoff | G06Q 30/06 705/26.5 |
| 2006/0229895 A1* | 10/2006 | Kodger, Jr. | G06Q 10/025 705/333 |
| 2007/0011187 A1 | 1/2007 | Chitgupakar et al. | |
| 2007/0073551 A1* | 3/2007 | Williams | G06Q 10/08 705/26.1 |
| 2007/0174213 A1 | 7/2007 | Whitehouse et al. | |
| 2007/0198977 A1 | 8/2007 | Abernethy et al. | |
| 2008/0103968 A1 | 5/2008 | Bies et al. | |
| 2008/0133659 A1* | 6/2008 | Aldrey | G06Q 10/08 709/204 |
| 2008/0169343 A1 | 7/2008 | Skaaksrud et al. | |
| 2009/0146410 A1* | 6/2009 | Uslontsev | G06Q 10/08 283/81 |
| 2009/0172084 A1 | 7/2009 | Lavanya et al. | |
| 2009/0172126 A1 | 7/2009 | Brennan et al. | |
| 2009/0265585 A1 | 10/2009 | Ikegami | |
| 2010/0076903 A1* | 3/2010 | Klingenberg | G06Q 10/08 705/333 |
| 2010/0179892 A1 | 7/2010 | O'Brien et al. | |
| 2010/0250549 A1 | 9/2010 | Muller et al. | |
| 2010/0323722 A1* | 12/2010 | Hatami | H04W 4/21 455/456.3 |
| 2011/0029429 A1 | 2/2011 | Whitehouse | |
| 2011/0133888 A1* | 6/2011 | Stevens | G06Q 50/28 340/8.1 |
| 2011/0173144 A1 | 7/2011 | Shan et al. | |
| 2011/0231334 A1* | 9/2011 | Jindel | G06Q 10/08 705/335 |
| 2011/0317158 A1 | 12/2011 | Lyng et al. | |
| 2012/0054754 A1 | 3/2012 | Teichmann et al. | |
| 2012/0084090 A1 | 4/2012 | Woodard et al. | |
| 2012/0109777 A1 | 5/2012 | Lipsitz et al. | |
| 2012/0216133 A1 | 8/2012 | Barker et al. | |
| 2012/0265676 A1 | 10/2012 | Gould et al. | |
| 2013/0056533 A1 | 3/2013 | Zimberoff et al. | |
| 2013/0061337 A1 | 3/2013 | Zimberoff et al. | |
| 2013/0144763 A1 | 6/2013 | Skyberg et al. | |
| 2013/0179361 A1* | 7/2013 | Williams | G06Q 10/08 705/330 |
| 2013/0304639 A1* | 11/2013 | Acsay | G06Q 30/04 705/40 |
| 2013/0346249 A1* | 12/2013 | Li | G06Q 30/0623 705/26.61 |
| 2014/0149308 A1* | 5/2014 | Ming | G06Q 10/0833 705/333 |
| 2014/0180959 A1* | 6/2014 | Gillen | G06Q 10/0833 705/341 |
| 2014/0208325 A1 | 7/2014 | Chen et al. | |
| 2014/0278099 A1 | 9/2014 | Schenken | |
| 2015/0046361 A1* | 2/2015 | Williams | G06Q 10/083 705/330 |
| 2015/0120598 A1* | 4/2015 | Fadell | G06Q 10/0631 705/333 |
| 2016/0196527 A1 | 7/2016 | Bose et al. | |

OTHER PUBLICATIONS

Ross, Jeanne W., United Parcel Services: Delivering Packages and E-Commerce Solutions (Aug. 2001). Available at SSRN: https://ssrn.com/abstract=305714 or http://dx.doi.org/10.2139/ssrn.305714 (Year: 2001).*

"Endicia Releases Unique Return Shipping Solution," retrieved from http://www.endicia.com/about-us/press-room/20140610, last accessed May 13, 2015, Jun. 10, 2014, 2 pages.

"Return Shipping Labels—Simplify Product Returns Without the Extra Cost of Accounts & Permits," retrieved from http://www.endicia.com/Features/ReturnShippingLabels/, last accessed May 13, 2015, undated, 2 pages.

"Newgistics: Offering Reverse Logistics to Easily Manage Returns," retrieved from http://www.newgistics.com/corp_returns/#newgisticssmartlabelandshipmentmanager, last accessed May 13, 2015, undated, 5 pages.

"E-Commerce Technology—The Most Modular and Scalable E-Commerce Platform that Grows With Your Business," http://www.newgistics.com/corp_ecommerce/index.aspx, last accessed May 13, 2015, undated, 6 pages.

"Returns Made Easy," retrieved from <https://www.usps.com/returns/>, last accessed May 13, 2015, undated, 5 pages.

"Return Services & Options for Parcels," retrieved from https://www.usps.com/business/return-services.htm, last accessed May 13, 2015, undated, 6 pages.

Unpublished U.S. Appl. No. 13/647,001 to Yoggi, filed Oct. 8, 2012 and entitled "Systems and Methods for Providing Shipping Service Guarantees," 44 pages.

International Search Report and Written Opinion issued for PCT Application No. PCT/US2017/020662, dated May 19, 2017, 14 pages.

U.S. Appl. No. 12/316,542, JP Leon.
U.S. Appl. No. 12/500,970, John Clem.
U.S. Appl. No. 13/705,935, Ken McBride.

(56) References Cited

OTHER PUBLICATIONS

U.S. Appl. No. 13/828,800, Charles Atkinson.
U.S. Appl. No. 13/647,001, Pradipe Yoggi.
Leon, JP, U.S. Appl. No. 12/316,542, filed Dec. 9, 2008.
Clem, John, U.S. Appl. No. 12/500,970, filed Jul. 10, 2009.
McBride, Ken, U.S. Appl. No. 13/705,935, filed Dec. 5, 2012.
Atkinson, Charles, U.S. Appl. No. 13/828,800, filed Mar. 14, 2013.
Grabara, J. et al. "The Role of Information Systems in Transport Logistics," International Journal of Education and Research, vol. 2, No. 2, Feb. 2014, 8 pages.

* cited by examiner

SYSTEMS AND METHODS IMPLEMENTING AUTOMATED SHIPMENT STATUS TRACKING

CROSS-REFERENCE TO RELATED APPLICATIONS

The present application is related to, and hereby claims benefit of priority to, and commonly assigned U.S. provisional patent application Ser. No. 62/082,393 entitled "SYSTEMS AND METHODS FOR CLOUD-BASED APPLICATION ACCESS TO RESOURCES," filed Nov. 20, 2014, the disclosure of which is hereby incorporated herein by reference.

TECHNICAL FIELD

The invention relates generally to shipment tracking and, more particularly, to obtaining and utilizing status information regarding items being shipped by one or more shipping service providers.

BACKGROUND OF THE INVENTION

The shipment of items, such as letters, flats, and parcels, via various shipping service providers, such as the United States Postal Service (USPS), United Parcel Service (UPS), Federal Express (FedEx), Dalsey, Hillblom and Lynn (DHL), and local and regional couriers, has been commonplace for years. With the advent of the Internet and the advent of innumerable e-commerce merchants, not only have the number of items shipped increased appreciably in recent years, but so too have the number of shippers and recipients of such items.

Often a shipper, such as a "brick and mortar" merchant, an online merchant, or an electronic marketplace (e.g., eBay, Amazon Marketplace, etc.) seller, or a recipient, such as a purchaser, a client, or gift recipient, is desirous of information regarding the progress of an item through the stream of shipped items (referred to herein as "mail stream", whether with reference to the services of a postal service or other shipping service provider). Accordingly, shipping service providers have often provided tracking numbers in association with a shipment, whereby one or more such tracking numbers may be entered into a user interface (e.g., a web page hosted by the shipping service provider) in order to query the shipping service provider as to the last reported status of the shipment. For example, as personnel and/or equipment of the shipping service provider handles shipped items, a barcode or other information from the item may be scanned and thus the then current disposition of the shipped item in that shipping service provider's mail stream recorded in a database. The relevant entry for a particular shipment may be accessed, using a corresponding tracking number for the shipment and the aforementioned user interface, and the user may then be provided information regarding the last recorded status of the shipment. It can readily be appreciated that obtaining information regarding the status of a large number of shipped items can be quite tedious.

Various systems have been developed for use in managing the shipment of items. For example, shipping management systems, such as the SHIPSTATION shipping management system provided by Auctane LLC of Austin Tex., provide functionality for the management of item orders, managing the picking and packing of items for order fulfilment, generation of invoices, packing slips, manifests, shipping labels, and postage or other prepaid shipping indicia, and tracking of shipment of items through a shipping service provider. Although such shipping management systems may interface with shipping service provider systems, such as though the use of a shipping service provider application programming interface (API), in order to facilitate querying the status of a shipped item, the implementations have not been without challenges. For example, where the shipping management system is being used by a shipper shipping a high volume of items and/or the shipping management system is used by a large number of shippers, obtaining shipped item status information from a shipping service provider's system for the large number of items for which management functionality is provided by the shipping management system may overwhelm or otherwise unacceptably impact the operation of the shipping service provider's system. For example, if the status of all shipments for which shipping management services were provided were to be repeatedly queried (e.g., hourly throughout a day), the performance of the shipping service provider systems may be severely impacted, possibly even to the point of an inability to satisfactorily perform basic functions. Accordingly, such shipping management systems have often supported only individual shipment status queries and/or ad hoc (e.g., on-demand) shipment status queries, without accommodating large scale, automated status queries for all or a large portion of the items for which management functionality is provided.

BRIEF SUMMARY OF THE INVENTION

The present invention is directed to systems and methods which facilitate automated querying of shipping services status information using a rules based engine. A shipping status query engine of embodiments implements various rules for intelligently querying one or more shipping service provider systems for information regarding the status of shipped items.

The rules utilized by a shipping status query engine of embodiments of the invention may include rules for determining what shipped items status information is to be queried and rules for determining when such status information is to be queried. For example, rules implemented by a shipping status query engine of embodiments may operate to grade shipments, such as based upon classes of service, special services, geographic area, shipping service provider, shipper, recipient, etc., or otherwise establish a hierarchy with respect to one or more such shipment criteria and establish the particular shipments for which information is to be queried and/or a frequency by which information regarding their status is to be queried. Additionally or alternatively, rules implemented by a shipping status query engine of embodiments may utilize information regarding a last event for the shipment, a location of a last event for the shipment, a time of the last event, etc. to determine if information regarding the status of the shipped item is to be queried, when status information is to be queried, and/or other actions to be taken with respect to the shipped item. In operation according to embodiments, the frequency by which information regarding a shipped item's status is queried by a shipping status query engine may vary based upon a last event or other metric.

Using the intelligent determinations of a rules base shipping status query engine, embodiments enable large scale, automated status queries for a very large number (e.g., thousands and hundreds of thousands) of shipped items. For example, such a shipping status query engine may be implemented in association with a shipping management system operable to provide management of shipped items for one or more high volume shippers and/or a large number of lower volume shippers. Through the intelligent operation of the shipping status query engine, status information may be automatically retrieved for a very large number of shipped items for which management services are provided by the shipping management system without overwhelming or otherwise unacceptably impacting the operation of the shipping service providers' systems from which the information is obtained, thereby providing improvement in the operation of the computer system itself. Such intelligence based queries may be performed automatically repeatedly (e.g., a plurality of times in a day) with respect to a large number of shipped items to maintain updated status information with respect to most or even all shipped items for which shipping management services are provided. Such intelligent querying of status information may not include queries for all shipped items in each query iteration (e.g., each query may include queries for particular shipped items, classes of shipped items, shipped items having particular last known events, etc.), although status information for most or all shipped items for which shipping management services are provided may be queried in the aggregate.

Embodiments may utilize a hybrid status query technique, wherein intelligent querying of shipping service provider systems may be supplemented with the use of bulk status information reporting by the shipping service providers for facilitating updated status information for most or all shipped items for which shipping management services are provided. For example, status information for particular shipped items, classes of shipped items, shipped items having particular last known events, etc. may be obtained using queries to the appropriate shipping service provider systems, while status information for some or all of the remainder of shipped items are obtained from a less timely source, such as a bulk status report provided by the shipping service provider.

It should be appreciated that, in operation according to embodiments of shipping management systems implementing a shipping status query engine in accordance with the concepts herein, users may be provided updated status information with respect to any or all of their shipped items, without requiring the users to manually initiate queries, thereby providing improvement to the state of the art in the shipping technologies. Moreover, having such automated access to updated status information for the shipped items, additional functionality may also be supported. For example, embodiments of a shipping management system may be adapted to utilize the updated status information to initiate messaging, such as to provide alerts, reminders, notifications, etc., upon detecting certain events and/or failure to detect certain events (e.g., initial scan of the shipment into the mail stream, delivery of the item, determination that the item is undeliverable, delivery guarantee met, etc.) in the lifecycle of shipments. Using updated status information herein, a shipping management system may operate to analyze the progress of a shipped item through the mail stream and communicate with a shipper and/or recipient, such as to optimize the chances for delivery of the shipped item (e.g., notify the recipient of impending delivery where a signature is required for delivery, notify a shipper where delivery is not possible for particular reasons to facilitate the shipper contacting the recipient, redirecting the shipment, etc.). Embodiments of a shipping management system may be adapted to utilize the updated status information to initiate actions (e.g., credit requests for unused postage indicia, reroute undeliverable shipments, provide alternate delivery instructions, etc.), possibly without user interaction (e.g., based upon preferences, rules based intelligence, etc.), with respect to particular shipments based upon detected events and/or failure to detect certain events.

Various information associated with particular shipped items may be utilized by embodiments of the invention for query determinations (e.g., what and when to query), to initiate messaging, and/or to initiate actions. For example, information such as events of the updated status information, special services to be provided with respect to shipped items, information regarding how a shipping service provider handles shipped items or events, information regarding how a shipping service provider provides particular services in a geographic area, etc., may be utilized in accordance with the concepts herein to provide particular messaging to one or more users, to cause particular actions to be taken, and/or the like.

The tracking of shipped item status provided according to embodiments of the invention is not limited to status of the shipped item within the mail stream. Embodiments operate to provide pre-shipment status information, such as to provide status information regarding manufacture of items, preparation of items for shipment, and/or other pre-shipment events. Moreover, embodiments operate to analyze status information for determining when shipped items have actually entered the mail stream, as opposed to merely having been made ready to enter the mail stream. Thus, embodiments of intelligent querying of shipping service provider systems are enabled to provide a panoptically accurate status tracking.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
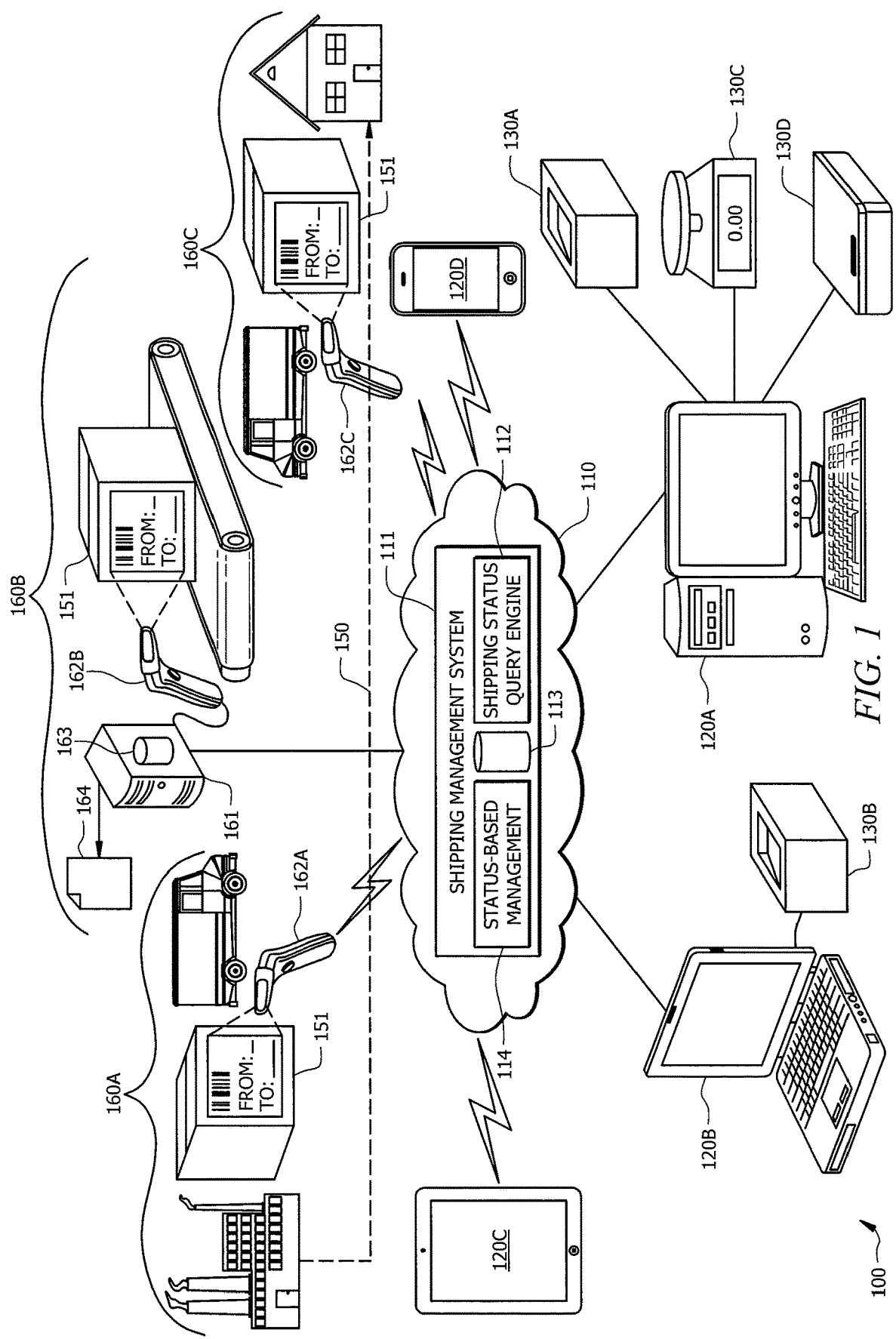
FIG. 1 shows an embodiment of a system adapted to obtain and utilize status information regarding items being shipped by one or more shipping service providers according to concepts of the present invention.

FIG. 1 shows an embodiment of system 100 adapted according to concepts of the present invention. In particular, system 100 of the illustrated embodiment includes shipping management system 111, operable to provide management functionality with respect to item shipment by one or more shippers, adapted to implement automated shipping status querying with respect to shipped items. Shipping management system 111 of the illustrated embodiment comprises shipping status query engine 112 operable to facilitate intelligent querying of one or more shipping service provider systems for information regarding the status of shipped items in accordance with the concepts herein. Shipping management system 111 of the illustrated embodiment further comprises database 113 operable to store shipment records, such as may be utilized to store status information obtained and updated according to embodiments of the invention.

In the embodiment illustrated in FIG. 1, shipping management system 111 comprises a cloud-based deployment of an application which is stored and executed by computing equipment disposed in the "cloud" of network 110. Accordingly, shipping management system 111, and shipping status query engine 112 and status-based management module 114 thereof, may comprise computer executable code executing on one or more processor-based systems (e.g., web servers) deployed in network 110. Shipping management system 111 may, for example, comprise a system providing various desired functionality such as in the form of software as a service (SaaS), infrastructure as a service (IaaS), platform as a service (PaaS), unified communications as a service (UCaaS), etc. As a specific example, shipping management system 111 may comprise a shipping management system operable to provide the automation of tasks associated with the shipment of items, including the management of item orders, managing the picking and packing of items for order fulfilment, generation of invoices, packing slips, manifests, shipping labels, and postage or other prepaid shipping indicia, and/or tracking of shipment of items through a shipping service provider. In accordance with embodiments of the invention, shipping management system 111 provides a multi-carrier shipping management system capable of providing various shipping functionality (e.g., rating, shipping indicia generation, packing list printing, shipping label printing, tracking, carrier pickup request, manifest printing, account management and payment, etc.) for a plurality of shipping service providers (e.g., the USPS, UPS, FedEx, DHL, local couriers, etc.).

It should be appreciated that although single instances of both a shipping management system, a shipping status query engine, and status-based management logic are shown for simplicity, embodiments may comprise any number of such instances of any or all. Moreover, although the illustrated embodiment provides a cloud-based implementation of a shipping management system and associated shipping status query engine and status-based management, the concepts of the present invention are applicable to other configurations, including locally disposed implementations, distributed implementations, etc. Furthermore, it should be appreciated that shipping status query engines and/or status-based management logic in accordance with embodiments herein may be provided and utilized other than in combination with a shipping management system.

Network 110 of the illustrated embodiment provides communication links facilitating the communication between various systems and components of system 100, such as recipient and/or shipper systems (e.g., user devices 120A-120D), shipping service provider systems (e.g., server 161), and shipping management system 111. Accordingly, network 110 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like.

User devices 120A-120D may be utilized by one or more shippers (e.g., merchant, manufacturer, e-commerce seller, etc.) and/or one or more recipients (e.g., a purchaser, client, gift recipient, etc.) for management of shipments, obtaining information regarding shipments, and the like. User devices 120A-120D of embodiments comprise processor-based systems (e.g., a terminal in the form of one or more computers, workstations, kiosk terminals, portable processor-based devices, servers, etc.) operable under control of one or more instruction sets (e.g., software, firmware, applet, etc.) adapted to cooperate with shipping management system 111 to provide desired functionality, such as the aforementioned exemplary shipping management functionality. User devices 120A and 120B of the illustrated embodiment, for example, comprise computer systems having a processor, memory, and input/output to enable interaction with shipping management system 111 for providing at least some portion of functionality available through operation of system 100. User device 120C of the illustrated embodiment comprises a tablet device having a processor, memory, and input/output to enable interaction with shipping management system 111 for providing at least some portion of functionality available through operation of system 100. User device 120D of the illustrated embodiment comprises a smart phone having a processor, memory, and input/output to enable interaction with shipping management system 111 for providing at least some portion of functionality available through operation of system 100. The communication links between the user devices and the other nodes of system 100 (e.g., shipping management system 111, computing resources 130A-130D, other ones of user devices 120A-120D, etc.) may comprise wired links (e.g., as illustrated for user devices 120A and 120B) or wireless links (e.g., as illustrated for user devices 120C and 120D), as well as combinations thereof. It should be appreciated that, although the illustrated embodiment shows a representative example of the number and configuration of user devices as may be utilized with respect to system 100, the concepts of the present invention are not limited to application to the particular number or configuration of user devices shown.

Server 161 may be utilized by one or more shipping service providers (e.g., the USPS, UPS, FedEx, DHL, local courier, etc.) for facilitating and/or managing the providing of shipping services, such as for providing shipment of items through the mail stream, as represented by mail stream 150 moving shipped item 151 from point of origin 160A to destination point 160C via processing point 160B. Server 161 of embodiments comprises one or more processor-based systems (e.g., web server, blade server, server farm, etc.) operable under control of one or more instruction sets (e.g., software, firmware, applet, etc.) adapted to provide information to shipping management system 111 facilitating desired functionality, such as the aforementioned exemplary shipping management functionality. Sever 161 of the illustrated embodiment, for example, may comprise a computer system having a processor, memory, and input/output to enable interaction with shipping management system 111 for facilitating at least some portion of functionality available through operation of system 100. The communication links between the server and the other nodes of system 100 (e.g., shipping management system 111, item processing resources 162A-162C, user devices 120A-120D, etc.) may comprise wired links (e.g., as illustrated between server 161 and network 110) or wireless links (e.g., as illustrated for item processing resources 162A and 162C), as well as combinations thereof. It should be appreciated that, although the illustrated embodiment shows a representative example configuration of a single shipping service provider system for simplicity, the concepts of the present invention are not limited to application to the particular number or configuration of shipping service provider devices shown. In particular, in a multi-carrier shipping management system embodiment, a plurality of shipping service provider systems (e.g., a plurality of servers, similar to server 161, and attendant resources, such as item processing resources 162A-162C) may be utilized.

From the foregoing it can be appreciated that user devices 120A-120D and server 161 of embodiments comprise processor-based systems operating under control of one or more instruction sets (e.g., software, firmware, applet, etc.) to provide operation as described herein. Such processor-based systems may comprise a central processing unit (CPU) (e.g., a processor from the PENTIUM or CORE line of processors available from Intel Corporation), memory (e.g., random access memory (RAM), read only memory (ROM), flash memory, disk memory, optical memory, etc.) storing the aforementioned one or more instruction sets and/or other data used herein, and appropriate input/output circuitry and devices (e.g., network interface card (NIC), keyboard, digital pointer, display screen, peripheral interface, microphone, speaker, wireless interface, etc.).

Various peripherals and other resources useful in providing functionality available through or facilitating operation of system 100 may be coupled to or otherwise in communication with devices of embodiments of system 100. For example, resources, such as one or more printers (e.g., thermal printer, ink printer, laser printer, etc.), imaging device (e.g., optical scanner, barcode scanner, handheld scanner, camera, biometric sample scanner, etc.), scale (e.g., electronic scale, digital scale), memory device (e.g., optical disk drive, hard disk drive, solid state disk drive, etc.), and/or the like, may be provided for use with any or all of the foregoing processor-based systems according to embodiments herein. Computing resources 130A and 130B, shown in the illustrated embodiment as printers (e.g., printer for printing proof of payment indicia, bills of lading, manifests, receipts, shipping labels, etc.) are shown as being coupled to user devices 120A and 120B, respectively. Similarly, computing resource 130C, shown as a scale (e.g., an electronic scale for weighing items for shipping), and computing resource 130D, shown as an imaging device (e.g., a scanner for obtaining images of shipping items, for scanning barcodes, for scanning addresses or other shipping item information, etc.), are shown as being coupled to user device 120A of the illustrated embodiment. Item processing resources 162A-162C, shown as imaging devices (e.g., a scanner for obtaining images of shipping items, for scanning barcodes, for scanning addresses or other shipping item information, etc.), are shown as being disposed for use at various locations (e.g., point of origin 160A, processing point 160B, and destination point 160C) along the path of the mail stream for a particular shipping service provider. Such item process resources are preferably coupled to, or communicate with (whether in real-time or from time-to-time) shipping service provider systems, such as sever 161, for use in managing, tracking, or otherwise facilitating the providing of shipping services with respect to shipped items (e.g., shipped item 151 being shipped from point of origin 160A to destination point 160C). Of course, configurations and deployments of resources different than that shown may be utilized according to embodiments of the invention. For example, a shipping service provider may employ additional or alternative configurations of resources, such as may include scales, printers, memory devices, etc., at various points in association with a mail stream.

Shipping service providers may provide services for movement of items between various points, whereby an item is introduced into a stream of shipped items of one or more shipping service providers. The process of providing such shipping services is represented in part in FIG. 1 by shipped item 151 being introduced into mail stream 150 at point of origin 160A (e.g., a manufacturer's location, a warehouse location, a fulfilment house location, etc.). For example, at point of origin 160A, shipping service provider personnel (e.g., a route carrier) or equipment (e.g., drone) may physically retrieve one or more shipped items (e.g., shipped item 151) and initiate its transport in the mail stream. Such shipping service provider personnel and equipment may utilize one or more item processing resources, such as item processing resource 162A, to scan the shipped items for billing and accounting purposes, validation purposes, collecting origination and/or destination information, tracking, etc. The information obtained from or in association with shipped item 151 may thus be provided to a shipping service provider system (e.g., server 161) for analysis, processing, reporting, and/or storage (e.g., within database 163).

The shipped items may be processed or otherwise handled at a number of points associated with the mail stream. For example, shipped items may be sorted, routed, grouped for transport, etc. at one or more shipping stations. Such handling of shipped items is represented by processing point 160B where shipping service provider personnel (e.g., mail handlers) or equipment (e.g., automated sorters, conveyers, etc.) handles shipped items (e.g., shipped item 151) for facilitating its continued transport in the mail stream. One or more item processing resources, such as item processing resource 162B, may be utilized to scan the shipped items for various purposes. The information obtained from or in association with processing of shipped item 151 may thus be provided to a shipping service provider system (e.g., server 161), such as to update or augment data therein (e.g., within database 163). It should be appreciated that, although a single processing point is shown with respect to mail stream 150 for simplicity, any number of such processing points may be provided in a mail stream, any or all of which may provide for the same and/or different processing operations with respect to shipped items.

The shipped items are preferably ultimately transported to an intended recipient. For example, shipping service personnel may attempt delivery of shipped items at a respective delivery point. Such delivery, or attempted delivery, of shipped items is represented by destination point 160C where shipping service provider personnel (e.g., a route carrier) or equipment (e.g., drone) may physically deliver or attempt to deliver one or more shipped items (e.g., shipped item 151). One or more item processing resources, such as item processing resource 162C, may be utilized to scan the shipped items for various purposes. The information obtained from or in association with delivery or attempted delivery of shipped item 151 may thus be provided to a shipping service provider system (e.g., server 161), such as to update or augment data therein (e.g., within database 163).

The shipping service provider, the shipper, the recipient, and/or others may utilize information regarding the progress of an item through the mail stream for various purposes, including management, monitoring, and tracking of the shipment. For example, the relevant entry or entries within database 163 for shipped item 151 may be accessed using a tracking number corresponding to the shipment including shipped item 151. Using such tracking numbers, a user may be provided information regarding the last recorded status of the shipment as it progresses through the mail stream. Accordingly, embodiments of system 100 are adapted to provide automated querying of shipping services status information. For example, the illustrated embodiment of shipping management system 111 includes shipping status query engine 112 operable to facilitate automated querying of shipping services status information in accordance with the concepts herein.

Shipping status query engine 112 of embodiment of the invention comprises a rules based engine for controlling status queries with respect to a large number of shipped items, such as most or all items for which shipping management system provides management services, most or all items shipped by a particular shipper, most or all items shipped to a particular recipient, etc. For example, shipping status query engine 112 of embodiments implements various rules for intelligently querying one or more shipping service provider systems, such as server 161, for information regarding the status of shipped items, such as may be stored in database 163. In operation according to embodiments, shipping status query engine 112 provides a scheduler for tracking a set of tracking numbers. As new tracking numbers are generated or otherwise obtained (e.g., in shipping management system 111), the tracking numbers (or some portion thereof) may be scheduled for an initial tracking event (e.g., 2 hours following creation) by operation of shipping status query engine 112. When the shipping status query engine of embodiments determines a shipment is ready to track, a tracking call may be performed with the relevant system or systems (e.g., one or more servers of the appropriate shipping service providers, such as USPS, FedEx, UPS, etc.). If no new or updated status information is found, the shipment may be rescheduled for one or more subsequent queries a small amount of time in the future by the status query engine (e.g., using a time offset and/or query frequency determined as described below). If, however, new or updated status information is found, the shipping status query engine of embodiments may operate to determine a next query time (e.g., using a time offset determined as described below) based on various of the factors as described herein (e.g., carrier shipping service, distance from current location to destination, historical average time from current location to next destination, etc.).

The rules utilized by shipping status query engine 112 of embodiments of the invention may include rules for determining what shipped items status information is to be queried, rules for determining when such status information is to be queried, rules for determining actions to be taken in response to particular status determinations, etc. Such rules may, for example, be stored in database 113 of embodiments.

A rules engine, as may be implemented by or in association with shipping status query engine 112 of embodiments, may comprise multiple facets. For example, a rules engine of embodiments includes an initiating event aspect, a shipment qualifying criteria aspect, and an actions to perform aspect. An initiating event aspect of such a rules engine may, for example, operate to cause shipping status query engine to initiate action upon determination that one or more shipping related event (e.g., generation of a shipping label, a package being shipped, an in transit event, an out for delivery event, a delivered status event, a delivery exception status event, etc.) has occurred. A shipment qualifying criteria aspect of a rules engine may designate criteria to qualify shipments for particular action initiated by the shipping status query engine based on the characteristics of the shipments (e.g., any package for which a shipping label has been generated and which has had an initial scan by the shipping service provider, any package which is shipped via "First Class Mail" and which remains more than 1 day or 100 miles from the intended destination, any package where "Insurance was purchased", any package where "Signature confirmation was requested", etc.). An actions to perform aspect of a rules engine may specify the particular actions the shipping status query engine is to perform (e.g., actions performed when the selected event(s) occur for any package matching the criteria specified). Actions that may be initiated in accordance with such rules may include, for example, determining a time offset for a next query, determining a query frequency for subsequent queries, initiating a status query, determining what information to query, determining what system to query or what other source(s) of information to be used, determining a current status from particular available information, etc.

Using such rules-based querying of embodiments, various information associated with particular shipped items may be utilized for query determinations (e.g., what and when to query). For example, information such as events of the updated status information, special services to be provided with respect to shipped items, information regarding how a shipping service provider handles shipped items or events, information regarding how a shipping service provider provides particular services in a geographic area, etc., may be utilized in accordance with the concepts herein. Utilization of such information in accordance with the concepts herein provides flexibility to analyze the characteristics of the shipments, the last event reported for the shipments, the service level for the shipments, the shipping service provider, the shipper, the recipient, and/or like to intelligently determine when to query initial and/or updated data for shipments. The intelligent queries provided through the use of rules by shipping status query engine 112 of embodiments thus operate to intelligently determine when is appropriate to query initial and/or updated status information for particular shipped items, thereby facilitating such operations for a very large number of items and shipments.

Rules implemented by shipping status query engine 112 may operate to grade shipments, or otherwise establish a hierarchy of one or more shipment criteria, for determining if information regarding those particular shipments is to be queried from a corresponding shipping service provider's system, for example. In operation according to embodiments, logic of shipping status query engine 112 may grade shipments based upon classes of service, special services, geographic area, shipping service provider, shipper, recipient, etc. For example, item shipments which are associated with a relatively low level of shipping services, such as first class mail, ground parcel service, economy class letter/parcel service, etc., may be graded lower than item shipments which are associated with a higher level of shipping services, such as priority mail, express mail, overnight delivery, two day delivery service, express parcel service, etc. A number of distinct grades may be utilized, such as to assign a unique grade to each level of service provided by the one or more shipping service providers supported, to provide a graduated range of tranches into which shipments having similar service characteristics (e.g., delivery time, special handling, etc.) are assigned, to assign grades in association with special services to be provided with respect to shipments, and/or the like. Such grades may be stored in association with records for the particular shipments in database 113, for example.

Embodiments may base determinations regarding the particular shipments for which information is to be queried, particular events or phases in the shipping cycle for which information is to be queried, and/or a frequency by which information regarding their status is to be queried at least in part upon the aforementioned grade (or other hierarchical designation) assigned to the shipment and/or one or more shipment criteria thereof. As an example of the utilization of the aforementioned grading, first class mail shipments may be assigned a low grade (e.g., a grade of "1" on an ascending scale), whereby this low grade is utilized by shipping status query engine 112 to determine that a query is not to be made at a current period or phase in the shipping cycle (e.g., after a last status indicated "out for delivery") and/or a frequency at which one or more queries is to be made (e.g., a first query to determine if the item has entered the mail stream is to be made no sooner than 8 hours after a shipping label/postage indicia was generated, queries for status updates are to be made no more frequently than every 12 hours after the item is reported as "in transit", etc.). In contrast, overnight shipments may be assigned a high grade (e.g., a grade of "10" on the aforementioned ascending scale), whereby this high grade is utilized by shipping status query engine 112 to determine that a query is to be made at a current period or phase in the shipping cycle (e.g., after a last status indicated "out for delivery") and/or a frequency at which one or more queries is to be made (e.g., a first query to determine if the item has entered the mail stream is to be made no later than 2 hours after a shipping label/postage indicia was generated, queries for status updates are to be made no less frequently than every 4 hours after the item is reported "in transit", etc.).

It should be appreciated that embodiments of the invention may utilize such shipment criteria (e.g., the aforementioned class of service (the examples above being "first class mail" and "overnight" and/or other shipment criteria such as special services, geographic area, shipping service provider, shipper, recipient, etc.) directly in an established hierarchy rather than providing a grading per se. Moreover, although exemplary embodiments are described above with reference to such shipment criteria information used in combination with information regarding a current period or phase in the shipping cycle, embodiments may omit such additional information or utilize other forms of additional information (e.g., information regarding an expected or estimated current time and/or distance to delivery of the shipment, such as may be determined as described below).

As can be appreciated from the foregoing examples, shipping status query engine rule implementations may utilize information regarding a last event to determine if information regarding the status of the shipped item is to be queried, when status information is to be queried, and/or other actions to be taken with respect to the shipped item. In particular, the above examples include instances where a last reported event, such as "in transit" or "out for delivery", is utilized in combination with the grade assigned to the shipment for controlling queries herein. Such information regarding a last event may likewise be utilized according to embodiments without associated grading information, if desired. Likewise, information regarding a grade or other hierarchical designation assigned to a shipment may be utilized according to embodiments without associated a last event information, if desired. Additionally or alternatively, rules implemented by a shipping status query engine of embodiments may utilize information regarding a location of a last event for the shipment, a time of the last event, etc. to determine if information regarding the status of the shipped item is to be queried, when status information is to be queried, and/or other actions to be taken with respect to the shipped item. For example, historical data collected regarding the performance of shipping services in a particular location or geographic area may be utilized in establishing whether a subsequent status query should be made (e.g., historical information regarding particular tasks performed/not performed at the location may be used) and/or the timing or frequency of one or more subsequent status queries (e.g., historical information regarding the rapidity at which services are performed at the location may be used). Similarly, information regarding the time at which a particular event was reported as having been performed may be utilized for determining if or when status queries are to be made according to embodiments. For example, information regarding the processes performed with respect to a shipping service may be utilized in combination with a time at which a particular event was reported as having been performed in establishing when a next status query is to be made.

It should be appreciated that the aforementioned time at which a particular event was performed is independent of, and may be appreciably different than, a time at which a status query was performed to obtain such information. Accordingly, a shipping status query engine may operate to initiate a subsequent status query very close in time to a status query in which a particular event was reported as having transpired, where the relationship between the then present time and the time at which the event was reported as having transpired suggest that a next event of significance or interest may occur. Operation in accordance with such embodiments is adapted to detect a change in status more accurately than as a result of subsequent queries based upon a time at which a previous query was made.

As previously mentioned, embodiments may operate to utilize information such as the foregoing grading of shipments, special services, etc. to determine not only when a query is to be made, but to determine if a query is to be made (at least in a then current phase of the shipping cycle). It should be appreciated that, although a query to a shipping service provider system may not be initiated with respect to a particular shipment, status information may nevertheless be obtained by shipping status query engine 112 of embodiments herein. For example, shipping status query engine 112 may utilize a hybrid status query technique, wherein intelligent querying of shipping service provider systems (e.g., server 161) may be supplemented with the use of bulk status information reporting (e.g., bulk status report 164) by the shipping service providers for facilitating updated status information for most or all shipped items for which shipping management services are provided. Such bulk status reports may be provided by shipping service providers upon request, periodically, from time-to-time, etc. The information in such bulk status reports may be less timely (e.g., some appreciable amount of time, such as 5 or 6 hours, may have transpired between events reported therein and the time at which the bulk status report is made available to users). However, such bulk status reports may nevertheless make some quality of status information available with respect to shipments serviced by the shipping service provider to users without the impact upon shipping service provider system performance associated with individual queries for information for each shipment reported therein. Accordingly, shipments for which less timely status information may be satisfactory (e.g., shipments for which the status changes more slowly) may be provided status update information using one or more bulk status reports.

As an example, status information for particular shipped items, classes of shipped items, shipped items having particular last known events, etc. (e.g., shipments having an assigned grade above a particular threshold, particular shipping services such as express mail or overnight shipments, shipments from a particular shipper, shipments to a particular recipient, etc.) may be obtained by shipping status query engine 112 using queries to the appropriate shipping service provider systems, such as server 161. In contrast, status information for other particular shipped items, classes of shipped items, shipped items having particular last known events, etc. (e.g., shipments having an assigned grade below a particular threshold, particular shipping services such as first class mail or ground shipments, shipments from a particular shipper, shipments to a particular recipient, etc.) may be obtained from a less timely source, such as bulk status report 164 provided by the appropriate shipping service provider. It should be appreciated that, although the aforementioned bulk status reports may include information for shipments (e.g., all shipments for a particular shipper) in addition to those meeting the criteria for use of the less timely status information according to embodiments, only the information for the particular shipments meeting the criteria for use of the less timely status information be used from the bulk status report while more timely status information for other shipments may be queried from server 161 by shipping status query engine 112 according to embodiments herein.

Figure 2:
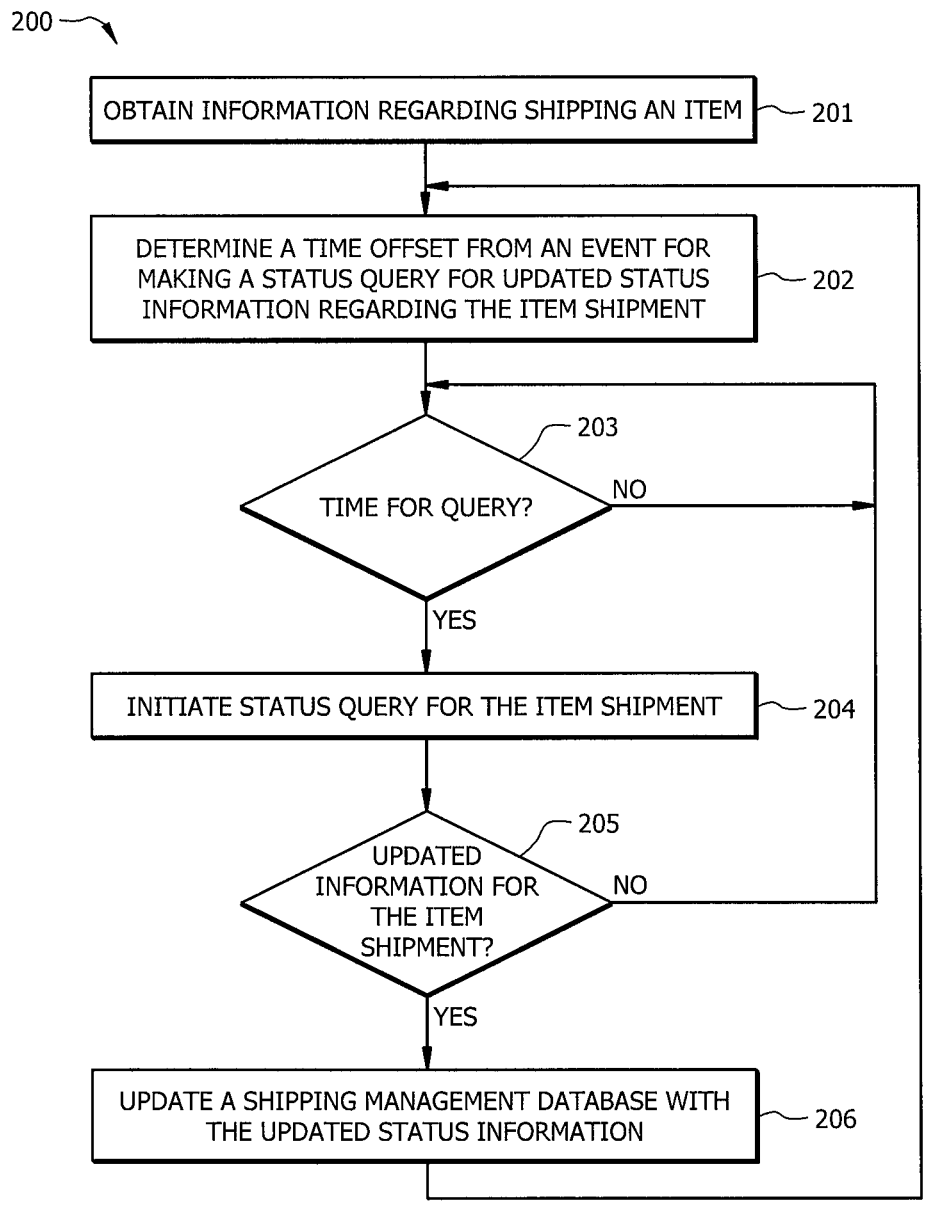
FIG. 2 shows a high level flow diagram of operation of a query technique implemented according to embodiments of the present invention.

Flow 200 of FIG. 2 shows a high level flow diagram of operation of a query technique implemented according to embodiments of the present invention. It should be appreciated that, although described with reference to a single shipment, operation according to flow 200 of embodiments may be implemented with respect to a plurality of shipments, whether for one or more shippers, one or more recipients, and/or one or more shipping service providers.

Flow 200 of the illustrated embodiment includes block 201 wherein information regarding the shipping of an item is obtained. Such information may include information regarding the shipper, information regarding the recipient, information regarding the shipping service provider to provide the shipping services, information regarding the shipping services to be provided, information regarding the item to be shipped, information regarding a state of shipment processing by the shipper, and/or the like. Such information, or a portion thereof, may be obtained through shipper and/or recipient interaction with shipping management system 111, such as when a shipper processes an order including the item, generates a shipping label and/or postage indicia, etc. Additionally or alternatively, the foregoing information, or a portion thereof, may be obtained from various sources, such as order detail information, user account information, public databases (e.g., address databases, manufacturer datasheets or specifications, shipping service provider published services guides, etc.). Moreover, such information, or a portion thereof, may be generated by logic of shipping management system 111, such when logic of shipping status query engine 112 operates to grade shipments.

At block 202 of the illustrated embodiment, a time offset from an event is determined for making a status query with respect to the item shipment. For example, based upon information regarding the item shipment obtained in block 201 (e.g., a grade assigned to the shipment, a hierarchy of one or more shipment criteria for the shipment, special services to be provided with respect to the shipment, a shipping service provider to provide the shipping services, etc.), a time from a previous event associated with the shipment after which a status query may be made to a shipping service provider system regarding the shipment is to be made may be determined. As a specific example, a time from the generation of a shipping label or postage indicia may be determined for querying the shipping service provider system to determine if the shipment has entered the mail stream (e.g., to determine if an initial scan of the shipped item has been performed). As discussed above, this time may vary based upon various aspects of the shipment. Moreover, although not specifically shown in flow 200 of FIG. 2, it may be determined that status queries to a shipping service provider system are not to be made with respect to the shipped item (e.g., at the present phase in the shipping cycle), such as where a hybrid status query technique supplements intelligent querying of shipping service provider systems with the use of bulk status information reporting.

The determinations made at block 202 of embodiments of the invention may additionally or alternatively include a determination as to a frequency at which subsequent status queries are to be made with respect the shipment should a change in status not be reported in response to a previous status query. Like the time offset for the status query discussed above, the periodicity of such subsequent status queries may be based upon information regarding the item shipment obtained in block 201. For example, the periodicity for status queries may be determined, or may be determined to be more or less frequent, based upon a particular phase of the shipment process the shipment is currently in or a last reported status of the shipment. As a specific example, as a shipment is determined to be more near its intended destination, or is more near the delivery phase of the shipment process, the periodicity of status queries may be decreased (i.e., status queries may be determined to be made more frequently), according to embodiments of the invention. For example, when a shipment incurs one or more tracking events during its journey (e.g., arrival at a sorting facility), embodiments may operate to determine an expected or estimated time and/or distance to delivery of the shipment (e.g., from the shipment's current location to the intended destination). The determined time and/or distance to delivery may be utilized in determining when to next attempt, and/or how frequently to attempt, to track the shipment by issuing a status query with respect to the shipment.

The aforementioned time offset and/or frequency for subsequent requests may be determined according to various techniques according to embodiments of the invention. In accordance with some embodiments in which a determination with respect to a shipment being more/less near its intended destination is used for timing of subsequent queries (e.g., timing offset and/or frequency), current location information for the shipment (e.g., the zip code, address, latitude and longitude, and/or the like of a last reported/known location of the shipment, whether that is the shipping origin, a facility handing the shipment, etc.) and location information for the intended destination of the shipment (e.g., the zip code, address, latitude and longitude, and/or the like of the intended destination) may be utilized to determine a distance, or relative distance, from which a timing for subsequent queries is determined. In operation according to embodiments, the foregoing distance calculation may be made, for example, using the haversine formula. Embodiments may not utilize precise location information for the foregoing distance or relative distance determinations. For example, the first 3 digits of a zip code of the current location information and the first 3 digits of a zip code of the intended destination information may be utilized in a distance or relative distance determination (e.g., a comparison of these truncated zip codes may be utilized to determine the relative proximity of the shipment to the intended destination, to calculate a rough distance, etc.). Additionally or alternatively, such truncated zip code information may be utilized according to embodiments to generalize such location information for comparing, for identifying a base of relevant historical data (e.g., to ensure the likelihood that historical information will be available that is relevant to a shipment in question), and/or the like.

Time offset and/or frequency for subsequent requests may be determined according to embodiments based upon analysis in addition to or in the alternative to the foregoing exemplary distance based analysis. For example, embodiments may operate to analyze the carrier's delivery routes, such as to analyze historical data to predict the next location using the carrier's delivery routes (e.g., historical data may suggest carrier routes may or may not be changing, whereby such information may be utilized in altering predictions regarding next points in the journey for the shipment). The results of such an analysis may be used in combination with other analysis, such as distance analysis. For example, using the aforementioned predicted next location, the distance to the destination can be calculated to determine a frequency for subsequent status queries. Various shipment information may be utilized with respect to any of the foregoing analysis to provide robust and accurate determinations. For example, information regarding the particular shipping service being used may be taken into account in an analysis as routes and transit methods may play a role in how the package is transported. Similarly, the day of the week and/or time of day of the tracking event can be useful in the analysis to accurately query historical data to determine the next query schedule.

At block 203 of the embodiment illustrated in FIG. 2, a determination is made as to whether a time for initiating a status query with respect to the shipment has transpired. For example, where insufficient time from a last reported event has elapsed, processing may return to block 203 to allow further time to elapse and a further determination as to whether a time for initiating the status query has transpired. If, however, sufficient time from the last reported event has elapsed (e.g., sufficient time since generation of a shipping label for the grade assigned to the shipment), processing according to the illustrated embodiment proceeds to block 204 for initiating a status query.

In particular, a status query for the shipment may be made to a shipping service provider system at block 204 of the illustrated embodiment. For example, shipping status query engine 112 may operate to query shipping services status information for the shipment by interfacing with one or more shipping service provider systems (e.g., server 161), such as though the use of one or more shipping service provider API. Additionally or alternatively, shipping status query engine 112 of embodiments may operate to query systems other than those of a shipping service provider, such as to query a shipper system, a manufacturer system, a recipient system, etc. (e.g., where pre-shipment and/or post-shipment status information is supported) as may be performed using one or more API adapted for interfacing with such systems. Such information is utilized according to embodiments of the invention to provide a panoptically accurate status tracking information (e.g., taking into account information, more than the shipping status information available from a shipping service provider, from which shipping status is determined). The panoptically accurate status tracking information provided according to embodiments of the invention is generally more accurate than the status information available from shipping management systems, and often even more accurate than status information available from a shipping service provider. In particular, embodiments of the invention implement intelligent querying which is operable not only to provide queries which may be readily made to various systems (e.g., without overwhelming or otherwise unacceptably impacting the operation of the systems from which the information is obtained, accommodating limitations on data output (often referred to as "throttling") by the systems from which the information is obtained, but which are calculated to be made at a time updated information becomes available (e.g., more timely obtaining status information than ad hoc, random, or blind queries as may otherwise be implemented by shipping management systems). Moreover, embodiments of the invention implement intelligence to analyze status information, such as using additional shipment related information, to accurately determine a status (e.g., to analyze status information for determining when shipped items have actually entered the mail stream, as opposed to merely having been made ready to enter the mail stream), whereby the determined status may more accurately reflect the status than does information provided by a shipping service provider.

The foregoing status query may be included in a batch of status queries (e.g., for which similar query techniques have been implemented for other shipments in parallel or serially with respect to the above shipment) made to one or more systems, whether shipping service provider systems, shipper systems, manufacturer systems, recipient systems, etc. For example, a batch of status queries may be made to a particular shipping service provider system (e.g., using a shipping status API for the particular shipping service provider's system) for a plurality of shipments (e.g., a plurality of shipments, for which initial and/or updated status information is to be queried, being served by a same shipping service provider) provided management by shipping management system 111. Additionally or alternatively, a plurality of status queries may be made to a number of different shipping service provider systems (e.g., using a shipping status API compatible with multiple shipping service providers' systems and/or using multiple shipping status APIs for respective shipping service provider's systems) for a plurality of shipments (e.g., a plurality of shipments, for which initial and/or updated status information is to be queried, being served by different shipping service providers) provided management by shipping management system 111. Accordingly, it should be appreciated that the status query may be somewhat delayed from the selected or designated time offset from the previous event determined in block 202. Moreover, it should be appreciated that, although the illustrated embodiment of flow 200 shows application of the exemplary query technique implemented with respect to a single shipment, embodiments of the invention operate to support a plurality of shipments shipped via multiple channels and/or multiple carriers. Additionally, although flow 200 of FIG. 2 is described with respect to automated querying of status information, it should be appreciated that shipping management system 111 also supports manual queries, such as may be initiated by a merchant/shipper at will.

At block 205 of the illustrated embodiment a determination is made as to whether updated status information was obtained in response to the status query. If suitable updated status information is not obtained (e.g., the status has not changed, a next event is not reported, a particular predetermined event is not reported, etc.), processing according to the illustrated embodiment returns to block 203 for determining if a time for a subsequent status query has transpired. If, however, suitable updated status information is obtained (e.g., the status has changed, a next event in the shipping cycle is reported, a particular predetermined event is reported, etc.), processing according to the illustrated embodiment proceeds to block 206 wherein shipping status information is updated.

In particular, embodiments of the invention may operate to update status information in a record of database 113 stored with respect to the shipment. This updated status information may be utilized by status-based management module 114 of embodiments to initiate messaging and/or other actions as described herein.

After updating the status information, operation according to flow 200 of the illustrated embodiment returns to block 202 for a determination as to whether and/or when to make further status queries with respect to the shipment. For example, as previously discussed, whether subsequent status queries are made and/or the timing for such status queries may depend upon a last event for the shipment, as well as other characteristics (e.g., the grade assigned to the shipment, the particular phase in which the shipment is in, the shipping service provider providing the shipping services, the area of the delivery point, the particular shipper, the particular recipient, etc.). Accordingly, returning to the processing provided by block 202 of the illustrated embodiment facilitates operation to implement changes for subsequent queries made with respect to the shipment. Of course, a determination may be made that the query timing (e.g., initial time offset from the previous event and/or frequency for queries thereafter) is to remain unchanged from a previous iteration according to embodiments.

Using the intelligent determinations of a rules base shipping status query engine, particularly with the aforementioned hybrid status query technique, embodiments enable large scale, automated status queries for a very large number (e.g., thousands and hundreds of thousands) of shipped items. Shipping status query engine 112 implemented in association with shipping management system 111 operable to provide management of shipped items for one or more high volume shippers and/or a large number of lower volume shippers may be utilized to provide automated status queries for all, or some large portion, of the shipped items under management by shipping management system 111. Through the intelligent operation of shipping status query engine 112, it should be appreciated that querying of status information may not include queries for all shipped items in each query iteration (e.g., each query may include queries for particular shipped items, classes of shipped items, shipped items having particular last known events, etc.), although status information for most or all shipped items for which shipping management services are provided may be queried in the aggregate.

In operation according to embodiments of shipping management systems implementing a shipping status query engine in accordance with the concepts herein, users may be provided updated status information with respect to any or all of their shipped items, without requiring the users to manually initiate status queries. Moreover, having such automated access to updated status information for the shipped items, additional functionality may also be supported. The illustrated embodiment of shipping management system 111 is adapted to include status-based management module 114 utilizing the aforementioned updated status information to provide management functionality with respect to the shipped items. For example, status-based management module 114 my initiate messaging with respect to shipped items, such as to provide alerts, reminders, notifications, etc., upon detecting certain events and/or failure to detect certain events (e.g., initial scan of the shipment into the mail stream, delivery of the item, determination that the item is undeliverable, delivery guarantee met, etc.) in the lifecycle of shipments. Additionally or alternatively, embodiments of status-based management module 114 may utilize the updated status information to initiate actions (e.g., credit requests for unused postage indicia, reroute undeliverable shipments, provide alternate delivery instructions, etc.), possibly without user interaction (e.g., based upon preferences, rules based intelligence, etc.), with respect to particular shipments based upon detected events and/or failure to detect certain events.

Similar to shipping status query engine 112, status-based management module 114 of embodiments may implement a rules based engine in providing management functionality with respect to shipped items. A rules engine, as may be implemented by or in association with status-based management module of embodiments, may comprise multiple facets, such as including an initiating event aspect, a shipment qualifying criteria aspect, and an actions to perform aspect. An initiating event aspect of such a rules engine may, for example, operate to cause status-based management module action to initiate upon determination that one or more shipping related event (e.g., generation of a shipping label, a package being shipped, an in transit event, an out for delivery event, a delivered status event, a delivery exception status event, etc.) has occurred. A shipment qualifying criteria aspect of a rules engine may designate criteria to qualify shipments for particular action initiated by the status-based management module based on the characteristics of the shipments (e.g., any package that is shipped via "FedEx 2nd Day Air" and "Order value is over $1000", any package where "Insurance was purchased", any package where "Signature confirmation was requested", etc.). An actions to perform aspect of a rules engine may specify the particular actions the status-based management module is to perform (e.g., actions performed when the selected event(s) occur for any package matching the criteria specified). Actions that may be initiated in accordance with such rules may include, for example, sending an email message or notification to a shipper and/or recipient, sending a SMS text message to a shipper and/or recipient, updating a shipper's and/or market place database, etc. Examples of implementing such actions include notifying the purchaser/intended recipient when their package is out for delivery (and perhaps other particulars, such as that signature confirmation was requested), notifying the merchant/shipper when a package incurs a delivery exception, notifying the merchant/shipper when any package meeting some criteria (e.g., value exceeding $1000, shipped to a particular recipient, etc.) is delivered successfully, and sending the purchaser/intended recipient an email after the package is delivered asking for feedback/reviews.

The messaging (e.g., to provide alerts, reminders, notifications, etc.) by status-based management module 114 may comprise transmission of communications such as emails, text messages, telephone calls, social media (e.g., communication via Twitter feeds and Facebook messages or notification), etc. However, such messaging may additionally or alternatively include providing information within applications (e.g., client applications, applets, browser based clients, etc.) operable on one or more user devices (e.g., user devices 120A-120D). The providing of such information may comprise initiating a dialog box within such applications, dynamically changing a status reported through such applications, and the like. Information may be provided to such applications by status-based management module 114 using open channel communication techniques, such as through implementation of channel groups, as shown and described in the above referenced patent application entitled "SYSTEMS AND METHODS FOR CLOUD-BASED APPLICATION ACCESS TO RESOURCES."

In providing an example of functionality that may be provided through use of shipping status information by operation of status-based management module 114 of embodiments, consider the initial shipping of an item by a shipper. Often the shipment of an item may essentially be initiated through the generation of a shipping label and/or postage indicia to be used in facilitating the shipment of the item from the shipper to the recipient. For example, a buyer (recipient) may purchase one or more items from a seller (shipper) via an electronic marketplace (e.g., eBay, Amazon Marketplace, etc.), whereby the shipper initiates shipment of the purchased item(s) to the recipient. Often, the shipper reports the shipment of the item(s) to the recipient as a customer service communication. However, such reports are traditionally based upon the shipping label or postage indicia having been generated, not the actual introduction of the item(s) into the mail stream for transport by the shipping service provider to the recipient. It is common for such shipping labels and postage indicia to be generated some appreciable amount of time (e.g., hours and even days) prior to the associated item(s) actually being introduced into the mail stream (i.e., prior to their actually having been "shipped"). Such premature reporting of the item having been shipped may lead the recipient to inaccurate expectations (e.g., believing an item ordered with two-day delivery is two days from delivery, when in fact the item may not actually begin the two day journey until the following day) or to become frustrated when attempting to obtain information regarding the shipment from the shipping service provider (e.g., a tracking number query to the shipping service provider may indicate that the tracking number does not exist or is not currently being handled by the shipping service provider).

Logic of status-based management module 114, operable in cooperation with shipping status query engine 112, may operate to provide notification of initial shipping of an item only upon that item actually having entered the mail stream according to embodiments herein. For example, shipping status query engine 112 may utilize information regarding a shipping label or postage indicia having been generated for an item shipment to schedule one or more status queries to server 161 for obtaining information from which it may be determined that the shipment has actually entered the mail stream (e.g., a status showing initial carrier scan of the shipping label or postage indicia). The period from when the shipping label or postage indicia event happened to the initial query for determining if the shipment has entered the mail stream, as well as the frequency at which subsequent queries are made if an initial query is indeterminate, may be determined based upon the aforementioned grading etc. (e.g., such queries may be made more slowly for certain shipments/items, such first class mail and ground parcels, than other shipments/items, such as express mail, priority mail, and overnight letters and parcels). For example, for an item shipped via first class mail or ground parcel service, or for a shipment having a relatively low grading, shipping status query engine 112 may wait for a relatively long period of time (e.g., 8 hours) after the shipping label generation event prior to querying server 161 to determine if a mail stream event has occurred with respect to that shipment. If a mail stream event is not detected upon the initial query, subsequent queries may be made at relatively long intervals (e.g., time periods of 4 or 8 hours). In contrast, for an item shipped via express mail or overnight service, or for a shipment having a relatively high grading, shipping status query engine 112 may wait for a relatively short period of time (e.g., 1 hour) after the shipping label generation event prior to querying server 161 to determine if a mail stream event has occurred with respect to that shipment. If a mail stream event is not detected upon the initial query, subsequent queries may likewise be made at relatively short intervals (e.g., time periods of 1 or 2 hours).

Shipping status query engine 112 may provide some or all status information obtained with respect to any or all of the shipments under management by shipping management system 111 to status-based management module 114 for providing management functionality. For example, where the status information indicates an initial event in the mail stream (e.g., initial carrier scan at point of origin 160A) for the aforementioned shipped item, status-based management module 114 may control messaging with respect to the recipient to provide a shipment notification (e.g., providing item shipped status information to an application executing upon one or more of user devices 120A-120D, transmitting an email or text to one or more of user devices 120A-120D, etc.). The foregoing messaging is not limited to transmission to a recipient. Embodiments may operate to transmit such messages to the shipper or shipper's system (e.g., for providing confirmation of a status, for automatically updating records, etc.) as well as a third party or third party's system (e.g., an operator of an electronic market place for use in monitoring merchant activities, for reporting to a recipient on behalf of a merchant, etc.).

It should be appreciated that, although perhaps delayed in time somewhat from the actual entry into the mail stream, the foregoing shipment notification accurately reflects the fact that the item has in fact shipped. Accordingly, the recipient's expectations are accurately managed, accurate information is available from the shipping service provider, etc. Through the appropriate selection of the initial query and query intervals with respect to types of shipments, shipping service, provider, etc. (e.g., using the aforementioned grading), delay between the actual events, such as entry into the mail stream, and reporting or other action may be minimized. For example, embodiments may utilize statistical and/or historical analysis, such as for particular shippers, shipping service providers, shipping services, geographic areas, time periods (e.g., seasonal), etc., to establish and/or revise parameters used by shipping status query engine regarding time periods for making status queries, events for initiating subsequent status queries, and/or the like.

It should be appreciated that, having detected a particular event, such as the foregoing entry of the shipment into the mail stream, subsequent status queries by shipping status query engine 112 regarding the shipment may be conducted at a frequency which is the same or different than that discussed above for subsequent queries utilized for detecting the previous event. For example, after having determined that the shipped item has entered the mail stream, routine status queries for updating the "in-route" status of the shipment may be performed at a frequency (e.g., daily for first class mail, ground shipments, or shipments having a relatively low grade and in 4 hour increments for express mail, overnight shipments, or shipments having a relatively high grade) different from, and even independent of, the query frequency implemented prior to the detected event.

Continuing with the example of functionality that may be provided through use of shipping status information by operation of status-based management module 114 of embodiments, the management functionality provided by status-based management module 114 is not limited to the detection of events (e.g., the above described entry into the mail stream). Management functionality provided according to embodiments of the invention may be based at least in part upon failure to detect an event. For example, postage indicia comprises a prepaid value indicia for shipping services to be performed which, if unused, results in costly spoilage to the shipper. Similarly, shipping labels often have prepaid indicia thereon, or otherwise bear prepaid value, which can result in costly spoilage if unused. Accordingly, logic of status-based management module 114 may operate to determine that a shipping label or postage indicia has not been detected in the mail stream. For example, shipping status query engine 112 may operate to monitor pre-shipment events, such as generation of shipping labels and postage indicia (e.g., to facilitate intelligent querying as described above) and provide that information to status-based management module 114. Logic of status-based management module 114 may then look to receive information regarding the entry of the shipment into the mail stream within some reasonable period of time, such as 2 to 3 days, whereby if shipping status query engine 112 does not provide information regarding an event indicating that the shipment has been entered into the mail stream logic of status-based management module 114 may determine that the shipment has not, or may not have, been shipped. Accordingly, status-based management module 114 may initiate an alert to the shipper (e.g., providing item overdue for shipping status information to an application executing upon one or more of user devices 120A-120D, transmitting an email or text to one or more of user devices 120A-120D, etc.) to alert the shipper to the situation, such as for investigation by the shipper, for refund processing (e.g., in the event of a lost or unused value indicia) by the shipper, and/or the like.

Actions initiated under control of status-based management module 114 of embodiments are not limited to messages and alerts. Continuing with the foregoing example, logic of status-based management module 114 may initiate processing to obtain a refund for the value of an unused shipping label or postage indicia in accordance with embodiments herein. For example, where a shipping label is not detected has having entered the mail stream some predetermined period (e.g., 3 days) after having been generated, logic of status-based management module 114 may initiate an alert to the shipper. Where the shipper does not respond within a predetermined period (e.g., 1 day) that refund processing is not desired, logic of status-based management module 114 of embodiments may initiate automated refund processing.

It should be appreciated that, although the foregoing examples have been with reference to events occurring at the initiation of the shipping cycle for a shipment, functionality provided according to the concepts herein is not limited to the initial shipping cycle phase. Embodiments of the present invention provide for status tracking and providing appropriate actions through cooperation of shipping status query engine 112 and status-based management module 114 throughout the shipping cycle (e.g., from creation of the shipment through delivery of the shipped items, or until the shipment is considered undeliverable). Accordingly, shippers, recipients, and others may be provided with timely updated status information regarding shipped items and/or provided functionality based at least in part on updated status information in operation according to embodiments. For example, using information provided by shipping status query engine 112 indicating delivery of the shipment, and information regarding special services for the shipment (e.g., the shipment having been insured), logic of status-based management module 114 may provide a message to the shipper to inform the shipper that the shipment has been delivered. Such a combination of the updated shipping event information and special services information facilitates intelligent delivery of timely information (e.g., restricting delivery of certain information to shipments of a certain value or otherwise indicated as being of particular importance, such as by having been insured), without overwhelming a party (e.g., the shipper and/or recipient) with undesired information for all shipments (e.g., relatively unimportant or more typical shipments made in very large scale).

Operation of status-based management module 114 of embodiments herein may provide for messaging which is more robust than reporting of updated status information for shipments. For example, logic of status-based management module 114 may analyze the progress of a shipment through the mail stream to proactively provide messaging to the shipper and/or recipient, take other actions with respect to the shipment, etc. Information in addition to the updated status information, such as the shipping service being provided, special services provided with respect to the shipment, historical information regarding the shipping service provider's provision of services, etc., may be utilized by logic of status-based management module 114 for providing such robust messaging. For example, where the level of shipping services are to provide delivery of the shipment within 3 days, logic of status-based management module 114 may analyze the status information provided by shipping status query engine 112 in association with shipping services information indicating that delivery should be achieved within 3 days, perhaps in combination with shipping service provider historical information indicating a typical amount of time to achieve delivery after one or more reported events, to determine that a shipment is going to be delivered late. Status-based management module 114 of embodiments may thus initiate messaging to the shipper and/or recipient to alert them to this situation, perhaps providing an estimation of the actual delivery date and/or soliciting alternative actions (e.g., delivery to a different address, holding of the shipment at a shipping service provider depot, etc.).

Messaging provided according to embodiments of the invention may be adapted to facilitate further actions and/or messaging with respect to the shipment, the shipper, the recipient, and/or the shipping service provider. For example, an initial message, such as the aforementioned shipment notification message issued when the shipment is determined to have actually entered into the mail stream may include a link or other selectable feature allowing the recipient to opt-in to receiving further, updated status information regarding the shipment (e.g., messages regarding the shipment being out for delivery, having been delivered, etc.). In an exemplary embodiment, such a message includes information uniquely identifying the shipment and/or recipient, whereby this unique information may be subsequently utilized to access information managed by shipping management system 111 for facilitating messaging and/or other actions as described herein. Additionally or alternatively, a shipper or recipient may provide preference information to shipping management system 111 (e.g., as may be stored in database 113), such as in association with a user account for the shipper and/or recipient, to establish the level of messaging and/or other actions to be implemented with respect to shipments by the shipper, directed to the recipient, handled by a particular shipping service provider, and/or combinations thereof.

Moreover, the actions initiated in accordance with embodiments may not only be provided for informational or shipping management purposes alone, but may be adapted to optimize the chances for delivery of the shipment. In operation according to embodiments, information regarding special services to be provided with respect to the shipment (e.g., whether signature is required for delivery, whether morning delivery is requested, etc.), information regarding how a shipping service provider handles deliveries in the delivery area (e.g., whether the shipment may be left at an address if no one is there to receive it, whether deliveries are to a centralized delivery point or to individual addresses, etc.), and/or like information in combination with tracking information to facilitate successful delivery of shipments. For example, using updated status information herein, shipping management system 111 may operate to analyze the progress of shipped item 151 through mail stream 150 and communicate with a shipper and/or recipient to optimize the chances for delivery of shipped item 151 (e.g., notify the recipient of impending delivery where a signature is required for delivery, notify a shipper where delivery is not possible for particular reasons to facilitate the shipper contacting the recipient, redirecting the shipment, etc.).

Logic of status-based management module 114 may, for example, monitor events reported by shipping status query engine 112 throughout the shipment of items to determine when the items are nearing delivery (e.g., detecting when the item has been received at a processing location in the mail stream nearest the delivery point, detecting when the status is reported as "out for delivery", etc.) and initiate action for facilitating the delivery of the shipped item. For example, status-based management module 114 may initiate a call to the recipient (e.g., placing a call to user device 120D) and/or send an alert to the recipient (e.g., providing a text or email to one or more of user devices 120A-120D) when it is determined that delivery is imminent in an effort to ensure that the recipient is available to take delivery. The recipient may thus be notified of the impending delivery and can take appropriate action to ensure the delivery is completed, such as to authorize delivery without recipient's signature (e.g., where the recipient knows they will be unavailable at the time of delivery), ask that the delivery be deferred or not undertaken (e.g., to have the delivery made on a different day or to allow the recipient to retrieve the shipment at a shipping service provider depot), ask that the delivery be made to a different location (e.g., where the recipient will be unavailable but a neighbor or other third party will be available to accept the delivery), pre-sign a delivery authorization form (e.g., to authorize drop-off delivery of the shipment), provide specific instructions for the delivery (e.g., to leave a package on a back porch, to ring the bell at the side door, etc.), and/or the like. Additionally or alternatively, status-based management module 114 may initiate a call to the recipient and/or send an alert to the recipient when it is determined that delivery of the shipped item has occurred (e.g., using status information such as "delivered" provided by shipping status query engine 112) to make the recipient aware of the delivery in a timely manner. The recipient may thus be notified of the delivery and can take appropriate action to allow prompt retrieval/usage of the delivered item(s), to avoid theft of the item if left at the delivery point, etc.

Although the foregoing examples of initiating messaging or other actions based upon monitoring of events reported by shipping status query engine 112 are in reference to a recipient, it should be appreciated that messaging and/or other actions may be initiated with respect to additional or alternative parties, such as shippers, shipping service providers, third parties, etc. For example, status-based management module 114 may initiate a call or send an alert to a shipper when it is determined that delivery is imminent in an effort to ensure that the delivery is completed. The shipper may thus be notified of the impending delivery and can take appropriate action, such as to call the recipient to remind them that they must be available to sign for the delivery.

Various functionality according to embodiments of the invention may be provided with respect to particular shipments, shipped items, shippers, recipients, shipped item grade or category, marketplace (e.g., eBay or Amazon Marketplace), etc. For example, the above described actions to optimize the chances for delivery of a shipment may be initiated with respect to some subset of shipped items for which shipping management is provided. Shippers and/or recipients may, for example, establish preferences whereby shipped items of certain threshold values (e.g., items or shipments valued at $1,000 or more) and/or for which a particular level of shipping service or grading is provided (e.g., overnight shipments or shipments having a relatively high grading) may be provided the above described functionality to optimize the chances for delivery of the shipment.

As can be appreciated from the foregoing, one or more of the messaging and/or actions which may be initiated under control of logic of status-based management module 114 of embodiments may be implemented optionally. For example, although providing more accurate reporting of shipment of an item using the above described shipment notification delayed for detection of actual entry into the mail stream, embodiments of the present invention may nevertheless optionally operate to provide traditional reporting for this and/or other aspects of the shipping cycle. As an example, certain electronic marketplaces, such as Amazon Marketplace, may reward/punish merchants based upon meeting certain criteria (e.g., providing shipment within 48 hours of an order having been placed). Such criteria may be determined differently than the improved reporting based upon status queries of embodiments of the invention. For example, such an electronic market place may provide for a shipping deadline being met by generation of a shipping label for the purchased item (perhaps realizing that the actual entry into the mail stream is, at least to some extent, dependent upon the shipping service provider and is often outside the direct control of the shipper). Accordingly, the more accurate reporting of the item having actually entered the mail stream, using the intelligent querying described above, may cause a merchant to receive punishment (e.g., removed as a preferred seller) when the shipping criteria has, in fact, been met. Accordingly, a shipper may select preferences or other settings within shipping management system 111 to elect not to utilize the shipment notification delayed for detection of actual entry into the mail stream. Alternatively, embodiments may operate to provide reporting to various parties (e.g., the electronic marketplace, recipient, shipper, etc.) based upon different status events, such as to report "shipment" having been made the electronic marketplace when a shipping label is generated and reporting shipment having been made to the recipient when the shipment is determined to have actually entered the mail stream.

Although examples have been provided herein with reference to messaging and/or taking other actions in association with the delivery of shipments, functionality provided according to the concepts herein is not limited in application to successful delivery of shipments. Embodiments of the present invention provide for status tracking and providing appropriate actions through cooperation of shipping status query engine 112 and status-based management module 114 when a shipment has an exception conditions, such as having been determined to be undeliverable or is refused delivery acceptance (e.g., with respect to an intended delivery address/point). For example, updated status information may be analyzed to determine that a shipment is undeliverable or has been refused and thus is in risk of being returned to a shipper. Logic of status-based management module 114 may initiate messaging to the shipper and/or recipient to alert either or both of the impending situation, to solicit re-routing information (e.g., an alternative delivery address), to solicit further handling instructions (e.g., to hold the shipment at a shipping service provider depot for retrieval by the recipient or shipper's agent), to request re-delivery (e.g., when a recipient will be available to accept delivery or after an agent at the delivery point has been instructed to accept delivery), and/or the like. Accordingly, unnecessary return and reshipment of items may be avoided.

Functionality provided according to operation of embodiments of the present invention is not limited to periods in which shipped items are in the mail stream. For example, embodiments operate to provide pre-shipment status information, such as to provide status information regarding manufacture of items (e.g., decoration of the item with a monogram has been completed), preparation of items for shipment (e.g., printed packing slips, packaged items for shipment, photo of packaged items), generation of shipping labels/postage indicia, payment for the order (e.g., where orders are not paid by the customer until they take action), receipt of the order, and/or other pre-shipment events. Logic of shipping status query engine 112 may, for example, operate to query one or more shipper systems (e.g., order processing system, manufacturing scheduling system, time and materials management system, warehouse management system, etc.) in order to obtain pre-shipment status information with respect to various items. Additionally or alternatively, information available from functionality of shipping management system 111 (e.g., order management, picking and packing management, order fulfilment management, invoicing, report generation, etc.) may be queried or otherwise obtained by shipping status query engine 112 for providing pre-shipment status information. In operation according to embodiments, shippers may input or otherwise directly provide pre-shipment status information, or some portion thereof, to shipping management system. Irrespective of how pre-shipment status information may be obtained, embodiments may operate to provide updated status information with respect to various items or orders in pre-shipment (i.e., prior to the items having been shipped). Such information may be utilized to provide pre-shipment status messaging, such as to report that the components to complete an order have now been received at the shipper's facility, that an item of an order is now being manufactured, that an order is being packaged for shipping, that an order has been packaged and is awaiting courier pickup, etc. Accordingly, embodiments may initiate messaging and/or actions, such as those described above, throughout the life cycle of an order and shipment to thereby provide a more robust item tracking system than is possible using tracking functionality presently available from shipping service providers.

Functionality provided during periods in which shipped items are not actually within the mail stream according to embodiments of the invention is not limited to a pre-shipment period. Embodiments of shipping management system 111 adapted according to embodiments herein may facilitate post-shipment messaging and/or other actions. For example, a recipient may wish to return an item to the shipper (e.g., due to an incorrect item having been shipped, as part of a liberal return policy by the shipper, etc.), wherein the shipper provides free return shipping (e.g., the shipper bares the cost of return shipping as a service to customers). Rather than having to include shipping labels having pre-paid postage indicia in each shipment (e.g., wherein a large number of such shipping labels would presumably go unused) and rather than establishing a pre-paid return postage account and program with a shipping service provider (e.g., a process and expense which may be prohibitive to smaller merchants), embodiments facilitate a recipient obtaining return shipping labels and/or postage indicia for a previously received shipment. In operation according to embodiments, a recipient may be provided access to shipping management system 111 through any of user devices 120A-120D, such as to receive messages (e.g., automated updated status messages to inform the recipient of the status of a shipment, such as prepared for shipment, having shipped, in transit, out for delivery, delivered, etc.) and/or to initiate actions (e.g., authorize delivery without signature, provide alternate delivery instructions, etc.). Such messages may provide the recipient with a link to access records (e.g., stored in database 113) for the shipment managed by shipping management system 111. Additionally or alternatively, identification information for the recipient (e.g., the recipient's email address used when placing an order with the shipper, a recipient's account established with the shipper and/or the shipping management system, etc.) may be utilized in accessing records for the shipments managed by shipping management system 111. Irrespective of the particular technique utilized to access the appropriate information for the shipment within shipping management system 111, the recipient may request and/or initiate generation of a suitable return shipping label and/or postage indicia, such as at the shipper's expense (e.g., using a shipper postage account accessible to shipping management system 111). For example, the recipient may cause a message to be provided to the shipper requesting a return shipping label, whereby the shipper may contact the recipient (e.g., to determine if a solution other than return may be provided) and/or authorize generation of a return shipping label for printing by a printing resource of the recipient's user device. Alternatively, the recipient may be provided the ability to generate and print such a shipping label, such as where the shipper has established preferences allowing for such actions in association with shipments meeting particular criteria (e.g., threshold item value, selected level of service, class of customer, etc.). Operation of shipping management system 111 of embodiments may provide tracking with respect to the return shipment, such as to track the return request, return approval, return in transit, return received by the merchant/original shipper, etc.

Moreover, functionality provided according to operation of embodiments of the present invention is not limited in application to the shipping services provided. For example, where the shipped item was purchased through an electronic marketplace (e.g., eBay, Amazon Marketplace, etc.) in which customer feedback plays an important role, messaging provided according to embodiments (e.g., providing updated status information showing the shipment is out for delivery or has been delivered) may remind the recipient to interact with an electronic marketplace system (e.g., to provide feedback for the shipper and/or shipped item). A status message provided according to embodiments may, for example, include a link or other selectable feature facilitating the recipients desired interaction with one or more systems other than shipping management system 111 (e.g., an electronic marketplace system). It should be appreciated that such a shipping event status update message, although also containing information beyond that of the shipping services provided (e.g., a reminder to interact with another system), the message is nevertheless reporting the status of the shipment and thus is expected to meet limitations possibly imposed by a shipping service provider regarding the use of shipment tracking information. Of course, messaging may likewise be provided to a shipper to facilitate their interaction with the recipient, such as to alert the shipper that the shipment has been delivered so the shipper may communicate with the recipient to solicit their feedback or other interaction outside of the shipping services provided, according to embodiments of the invention.

System 100 of embodiments of the invention is operable to provide status tracking and facilitating various actions with respect to shipments for which management is provided by shipping management system 111 for a plurality of shippers and recipients. Accordingly, shipping management system 111 adapted according to embodiments of the invention may provide access to information regarding all shipments for a particular shipper and/or all shipments for a particular recipient, where such shipments are under management of the shipping management system. For example, a shipper and/or recipient may utilize shipping management system 111 to obtain updated status information for all shipments associated with the shipper or recipient, respectively. The information for such shipments may be provided individually, such as on a shipment-by-shipment basis, or in consolidated or aggregated form, such as to provide a combined report for all shipments from the shipper, all shipments to the recipient, or a combination thereof. Similarly, shippers and/or recipients may be provided messaging and/or other actions with respect to such shipments, whether individually or in the aggregate, according to embodiments of the invention.

Additionally or alternatively, system 100 of embodiments of the invention is operable to provide status tracking and facilitating various actions with respect to shipments for which management is provided by shipping management system 111 for a plurality of shipping service providers, whether for a plurality of shippers and/or recipients or for individual shippers and/or recipients. Accordingly, shipping management system 111 adapted according to embodiments of the invention may provide access to information for a plurality of shipping service providers regarding all shipments for a particular shipper and/or all shipments for a particular recipient, where such shipments are under management of the shipping management system. For example, a shipper and/or recipient may utilize shipping management system 111 to obtain updated status information for all shipments associated with the shipper or recipient, respectively, for a number of shipping service providers. The information may be provided individually, such as on a shipment-by-shipment basis, or in consolidated or aggregated form, such as to provide a combined report for all shipments from the shipper, all shipments to the recipient, all shipments handled by a particular shipping service provider, or a combination thereof. Similarly, shippers and/or recipients may be provided messaging and/or other actions with respect to such shipments, whether individually or in the aggregate, according to embodiments of the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
obtaining, by a processor of a shipping management system, information regarding a plurality of shipments of items;
identifying, by the processor, one or more shipments of items of the plurality of shipments of items for which status queries are to be made, wherein the one or more shipments of items are identified based on shipment characteristics and the obtained information;
determining, by the processor, timing information for initiating the status queries with respect to the one or more identified shipments of items, wherein the timing information is determined at least in part based upon the obtained information and rules of a rules engine, wherein the rules of the rules engine are configured to determine timings for initiating the status queries with respect to shipped items, and wherein the timings are determined to reduce impact on a shipping service provider system;
dynamically adjusting, by the processor, timing for the initiating the status queries with respect to the one or more identified shipments of items, wherein the dynamically adjusting is based, at least in part, on an estimated delivery time and on an estimated delivery distance of the one or more shipments of items to a delivery destination of the one or more shipments of items;
automatically initiating, by the processor, a status query, for a shipment of an item of one or more identified shipments of items, of a shipping service provider system based upon the timing for the initiating the status queries with respect to the one or more identified shipments of items, wherein one or more application program interfaces (APIs) executable by the processor are configured to automatically initiate status queries via interfacing with the shipping service provider system, a shipper system, a manufacturer system, and a recipient system;

updating, by the processor, a shipping management system database record for the shipment of the item if the status query returns first tracking status information indicating a change in tracking status of the shipment of the item;

supplementing, by the processor, the shipping management system database record based on a bulk status report comprising second tracking status information of a plurality of shipments of items, wherein the plurality of shipments of items includes the shipment of the item, wherein the supplementing comprises updating the shipping management system database record for the shipment of the item based on changes to a tracking status of the shipment of the item included in the second tracking status information of the bulk status report, and wherein the second tracking status information is updated less frequently than the first tracking status information; and providing, by the processor, one or more notifications based on at least one of preferences of a sender, preferences of an intended recipient of the item, and changes detected in tracking status of the shipment of the item based on the shipping management system database record.

2. The method of claim 1, further comprising:
determining a panoptically accurate tracking status of the shipment of the item using the information returned from the status query and additional information regarding the shipment of the item, wherein the updating the shipping management system database record includes providing the panoptically accurate tracking status to the shipping management system database record, and wherein the panoptically accurate tracking status of the shipment of the item includes tracking status information associated with preparation of the item for shipment prior to the item being placed in a mail stream.

3. The method of claim 2, wherein the panoptically accurate tracking status comprises an actually shipped status determined from a shipped status reported by the shipping service provider system and information showing an initial scan of the shipment of the item into the mail stream.

4. The method of claim 1, wherein the determining the timing information for the status query comprises:
determining a time offset from an event at which the status query is to be made with respect to the shipment of the item, wherein the time offset is determined at least in part based upon the obtained information.

5. The method of claim 4, wherein the determining the timing information for the status query further comprises:
determining a frequency for subsequent status queries should one or more status queries fail to return suitable updated tracking status information, wherein the frequency for subsequent status queries is determined at least in part based on the obtained information.

6. The method of claim 4, wherein the obtaining information includes obtaining information regarding a special service to be provided with respect to the plurality of shipments of items, wherein the time offset is determined at least in part based upon a special service to be provided with respect to the shipment of the item.

7. The method of claim 1, wherein providing the one or more notifications comprises providing the one or more notifications through one or more social media communication channels, and wherein the determining the timing information for the status query comprises:
determining a distance metric with respect to an estimated current location for the shipment and a location of an intended destination for the shipment.

8. The method of claim 7, wherein the determining the timing information for the status query further comprises:
determining a class of service for the shipment.

9. The method of claim 7, wherein the distance metric is determined using a truncated zip code of the estimated current location and a truncated zip code of the intended destination location.

10. The method of claim 1, wherein the dynamically adjusting the timing for the initiating the status queries comprises decreasing a frequency of the initiating the status query in response to a predicted reduction in the estimated delivery distance of the one or more shipments of items to the delivery destination.

11. The method of claim 1, wherein the determining the timing information for the status query provides a different status query timing for status queries made with respect to the shipment of the item depending upon a last event reported with respect to the shipment of the item.

12. The method of claim 1, further comprising determining a grade assigned to each shipment of the plurality of shipments of items based on the obtained information, wherein the timing information is determined at least in part based upon the grade assigned to each shipment of an item of the plurality of shipments of items.

13. The method of claim 1, wherein a timing for initiating the status query for the shipment of the item is based at least in part on a last event in the shipment of the item, and wherein the last event comprises at least one of generation of a shipping label for the shipment of the item and generation of a postage indicia for the shipment of the item.

14. The method of claim 13, wherein the change in a tracking status is associated with an initial scan of the shipment of the item by a shipping service provider, and wherein the updating the shipping management system database record comprises designating the shipment of the item as having actually been shipped.

15. The method of claim 1, further comprising:
determining one or more actions based on the rules of the rules engine and updated information in the shipping management system database record for the shipment of the item, wherein the one or more actions comprise one or more of determining a time offset for a next query, determining a query frequency for subsequent queries to obtain additional updated tracking status information for the shipment of the item, initiating a status query to obtain the additional updated tracking status information, determining a type of the additional updated tracking status information to query, determining a system to query to obtain the additional updated tracking status information, and determining a current status from the additional updated tracking status information; and
performing the one or more actions.

16. The method of claim 15, wherein the performing one or more actions comprises:

initiating messaging to at least one of a shipper associated with the shipment of the item or an intended recipient of the shipment of the item.

17. The method of claim 16, wherein the messaging comprises:
informing the at least one of the shipper or the intended recipient that the shipment of the item has actually shipped after determining that an initial scan of the item has been performed by a shipping service provider.

18. The method of claim 15, wherein the performing one or more actions comprises:
initiating a predetermined action with respect to at least one of a shipper associated with the shipment of the item or an intended recipient associated with the shipment of the item for ensuring completed delivery of the shipment of the item.

19. The method of claim 18, further comprising:
determining that the updated information in the shipping management system database record for the shipment of the item suggests that the shipment of the item is out for delivery, wherein the initiating the predetermined action with respect to at least one of the shipper or the intended recipient comprises:
notifying the shipper that the shipment of the item is out for delivery and facilitating the shipper taking action with respect to the intended recipient to increase a chance that shipment of the item will be successfully delivered to the intended recipient.

20. The method of claim 1, further comprising:
performing one or more actions based upon a particular reported status of the shipment of the item and a failure to detect a particular event with respect to the shipment of the item.

21. The method of claim 20, wherein the particular reported status of the shipment of the item is a shipped status, the particular event is an initial scan of the shipment of the item by a shipping service provider, and the one or more actions is suppressing reporting the shipment of the item as having been shipped.

22. A system comprising:
a memory;
one or more processors;
one or more application programming interfaces (APIs) executable by the processors; and
a shipping status query engine executable by the one or more processors and having a set of rules adapted to control querying of a shipping service provider system for information regarding shipped item status, wherein the shipping status query engine is configured to:
obtain information regarding a plurality of shipments of items;
identify one or more shipments of items of the plurality of shipments of items for which status queries are to be made, wherein the one or more shipments of items are identified based on shipment characteristics and the obtained information;
determine a timing for which a status query is to be made with respect to a shipment of an item of the one or more shipments of items based on the set of rules, wherein the set of rules are configured to determine timings for initiating status queries with respect to shipped items, and wherein the timings are determined to reduce impact on a shipping service provider system;
dynamically adjust the timing for which a status query is to be made with respect to the shipment of the item, wherein the dynamically adjusting is based, at least in part, on an estimated delivery time and on an estimated delivery distance of the shipment of the item to a delivery destination of the item;
automatically initiate the status query for the shipment of the item from the shipping service provider system based upon the timing, wherein the one or more APIs are configured to automatically initiate status queries via interfacing with the shipping service provider system, a shipper system, a manufacturer system, and a recipient system;
update a shipping management system database record for the shipment of the item if the status query returns first tracking status information indicating a change in status of the shipment of the item;
supplement the shipping management system database record based on a bulk status report comprising second tracking status information on a plurality of shipments of items, wherein the plurality of shipments of items includes the shipment of the item, wherein the supplementing comprises updating the shipping management system database record for the shipment of the item based on changes to a tracking status of the shipment of the item included in the second tracking status information of the bulk status report, and wherein the second tracking status information is updated less frequently than the first tracking status information; and
provide one or more notifications based on at least one of preferences of a sender of the shipment of the item, preferences of an intended recipient of the shipment of the item, and the change in the tracking status of the shipment of the item.

23. The system of claim 22, wherein the shipping status query engine operating to determine the timing for the status query is configured to determine a time offset from an event at which the status query is to be made with respect to the shipment of the item, wherein the time offset is determined at least in part based upon the obtained information.

24. The system of claim 23, wherein the shipping status query engine operating to determine the timing for the status query is further configured to determine a frequency for subsequent status queries should one or more status queries fail to return suitable updated status information for the shipment of the item, wherein the frequency for the subsequent status queries is determined at least in part based on the obtained information.

25. The system of claim 22, wherein the shipping status query engine operating to obtain information regarding shipping an item includes operation to determine a grade assigned to the shipment of the item, wherein the time offset is determined at least in part based upon the grade assigned to the shipment of the item, and wherein different shipments of items of the plurality of shipments of items are assigned different grades.

26. The system of claim 25, wherein the shipping status query engine is further configured to determine a source for at least a portion of the obtained information.

27. The system of claim 22, wherein the status of the shipment of the item indicates an event, and wherein the event comprises at least one of generation of a shipping label for the shipment of the item and generation of a postage indicium for the shipment of the item.

28. The system of claim 22, further comprising:
a status-based management module configured to perform one or more actions based upon updated information in the shipping management system database record for the shipment of the item.

29. The system of claim 28, wherein the status-based management module operating to perform one or more actions is configured to initiate messaging to at least one of a shipper or an intended recipient of the shipment of the item.

30. The system of claim 29, wherein the status-based management module operating to initiate messaging is configured to inform the at least one of the shipper or the intended recipient of the shipment of the item to indicate that the shipment of the item has actually shipped after determining that an initial scan of the shipment of the item has been performed by a shipping service provider.

31. The system of claim 28, wherein the status-based management module operating to perform one or more actions is configured to initiate a predetermined action with respect to at least one of a shipper or an intended recipient of the shipment of the item for ensuring completed delivery.

32. The system of claim 28, wherein the shipping status query engine and the status-based management module comprise a shipping management system providing management functionality with respect to item shipment by a plurality of shippers.

33. The system of claim 32, wherein the shipping management system further provides management functionality with respect to a plurality of shipping service providers.

34. The system of claim 32, wherein the shipping management system comprises a cloud-based deployment of a shipping management application.

35. A non-transitory computer-readable storage medium storing instructions that, when executed by one or more processors, cause the one or more processors to perform operations comprising:
  obtaining information regarding a plurality of shipments of items;
  identifying one or more shipments of items of the plurality of shipments of items for which status queries are to be made, wherein the one or more shipments of items are identified based on shipment characteristics and the obtained information;
  determining a timing for which a status query is to be made with respect to a shipment of an item of the one or more shipments of items, wherein the timing is determined at least in part based upon the obtained information, a last event in the shipment of the item, and one or more rules configured to determine timings for initiating status queries with respect to shipped items, and wherein the timings are determined to reduce impact on a shipping service provider system;
  dynamically adjusting the timing for which a status query is to be made with respect to the shipment of the item, wherein the dynamically adjusting is based, at least in part, on an estimated delivery time and on an estimated delivery distance of the shipment of the item to a delivery destination of the item;
  automatically initiating the status query for the shipment of the item from the shipping service provider system based upon the timing, wherein one or more application program interfaces (APIs) executable by the one or more processors are configured to automatically initiate status queries via interfacing with the shipping service provider system, a shipper system, a manufacturer system, and a recipient system;
  updating a shipping management system database record for the shipment of the item if the status query returns first tracking status information indicating a change in status of the shipment of the item;
  supplementing the shipping management system database record based on a bulk status report comprising second tracking status information on a plurality of shipments of items, wherein the plurality of shipments of items includes the shipment of the item, wherein the supplementing comprises updating the shipping management system database record for the shipment of the item based on changes to a tracking status of the shipment of the item included in the second tracking status information of the bulk status report, and wherein the second tracking status information is updated less frequently than the first tracking status information; and
  performing one or more actions based upon updated information in the shipping management system database record for the shipment of the item.

36. The non-transitory computer-readable storage medium of claim 35, wherein the determining the timing for the status query comprises:
  determining a time offset from the last event in the shipment of the item.

37. The non-transitory computer-readable storage medium of claim 36, wherein the determining the timing for the status query further comprises:
  determining a frequency for subsequent status queries should one or more status queries fail to return suitable updated status information for the shipment of the item, wherein the frequency for subsequent status queries is determined at least in part based on the obtained information.

38. The non-transitory computer-readable storage medium of claim 35, wherein the last event in the shipment of the item comprises a pre-shipment shipment event, and wherein the obtaining information comprises obtaining pre-shipment information.

39. The non-transitory computer-readable storage medium of claim 38, wherein the pre-shipment information includes at least one of information regarding manufacture of the item, preparation of the item for shipment, or a combination thereof.

40. The non-transitory computer-readable storage medium of claim 35, wherein the last event in the shipment of the item comprises at least one of generation of a shipping label for the shipment of the item and generation of a postage indicium for the shipment of the item.

41. The non-transitory computer-readable storage medium of claim 40, wherein the change in status is associated with an initial scan of the shipment of the item by a shipping service provider, and wherein the updating the shipping management system database record comprises designating the item has having been shipped.

42. The non-transitory computer-readable storage medium of claim 35, wherein the performing one or more actions comprises:
  initiating messaging to at least one of a shipper associated with the shipment of the item or an intended recipient associated with the shipment of the item.

43. The non-transitory computer-readable storage medium of claim 35, wherein the performing one or more actions comprises:
  initiating a predetermined action with respect to at least one of a shipper associated with the shipment of the item or an intended recipient associated with the shipment of the item for ensuring completed delivery of the shipment of the item.

44. The non-transitory computer-readable storage medium of claim 43, further comprising:

determining that the updated shipping management system database record for the shipment of the item suggests that shipment of the item is out for delivery, wherein the initiating the predetermined action with respect to at least one of the shipper or the intended recipient comprises:

notifying the shipper that the item is out for delivery and facilitating the shipper taking action with respect to the intended recipient to increase a chance that the shipment of the item will be successfully delivered to the intended recipient.

\* \* \* \* \*